US008963929B2

(12) United States Patent
Kuroda et al.

(10) Patent No.: US 8,963,929 B2
(45) Date of Patent: Feb. 24, 2015

(54) ANIMATION DRAWING DEVICE, COMPUTER-READABLE RECORDING MEDIUM, AND ANIMATION DRAWING METHOD

(75) Inventors: Toyoharu Kuroda, Osaka (JP); Hideaki Yajima, Osaka (JP); Hidehiko Shin, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 413 days.

(21) Appl. No.: 13/497,348

(22) PCT Filed: Jun. 29, 2011

(86) PCT No.: PCT/JP2011/003716
§ 371 (c)(1),
(2), (4) Date: Mar. 21, 2012

(87) PCT Pub. No.: WO2012/011228
PCT Pub. Date: Jan. 26, 2012

(65) Prior Publication Data
US 2012/0236007 A1     Sep. 20, 2012

(30) Foreign Application Priority Data

Jul. 23, 2010 (JP) .................................. 2010-165987

(51) Int. Cl.
*G06T 13/00* (2011.01)
*G06F 9/44* (2006.01)
*G06F 9/455* (2006.01)

(52) U.S. Cl.
CPC .............. *G06T 13/00* (2013.01); *G06F 9/4443* (2013.01); *G06F 9/45512* (2013.01)
USPC ........................................................ 345/473

(58) Field of Classification Search
CPC .................. G06F 9/4443; G06T 13/00–13/80; G06T 15/005; G06T 2200/28
USPC .................................................. 345/473–475
See application file for complete search history.

(56) References Cited

U.S. PATENT DOCUMENTS

| 5,764,241 | A  | * | 6/1998 | Elliott et al. ................... 345/473 |
| 6,389,590 | B1 | * | 5/2002 | Miller et al. ................... 717/140 |
| 6,785,691 | B1 | * | 8/2004 | Hewett et al. .......................... 1/1 |
| 6,820,252 | B2 |   | 11/2004 | Sakamoto et al. |
| 7,746,347 | B1 | * | 6/2010 | Brown et al. .................. 345/522 |
| 2002/0099930 | A1 |   | 7/2002 | Sakamoto et al. |

FOREIGN PATENT DOCUMENTS

| JP | 2001-6001 | 1/2001 |
| JP | 2002-169696 | 6/2002 |
| JP | 2009-211187 | 9/2009 |

OTHER PUBLICATIONS

International Search Report issued Aug. 9, 2011 in International (PCT) Application No. PCT/JP2011/003716.

(Continued)

*Primary Examiner* — Charles Tseng
(74) *Attorney, Agent, or Firm* — Wenderoth, Lind & Ponack, L.L.P.

(57) ABSTRACT

An interpreter 11 outputs a drawing request to an animation controller upon interpreting an animation drawing instruction defined with use of a predetermined script variable. The animation controller 12 animation-displays a GUI by executing a program module described in a native language. Upon receiving the drawing request, the animation controller 12 converts the script variable into a native variable in the form of the native language, and animation-displays the GUI while sequentially updating the native variable.

13 Claims, 15 Drawing Sheets

(56) References Cited

OTHER PUBLICATIONS

"Part 2 Browser ga Kawaru Apuri Taio ni Shinka shita HTML 5 Nandemo Dekiru Web ni Naru", Nikkei Network, Aug. 28, 2009, No. 113, pp. 29-33.

Fumio Nonaka, "Micromedia Flash MX ActionScript Step Up Koza", MAC POWER, Nov. 1, 2003, vol. 14, No. 11, pp. 160-161.

Yoshinori Takesako, "Capter 1 Ima, Software Gijutsu no Sekai de Okiteiru Koto Kosokuka Kyoso wa CPU kara JavaScript Engine e", SoftwareDesign, May 18, 2010, No. 235, pp. 17-20.

Hajime Morita, "Dai 2 Bu <Tettei Kaibo> Shingata Engine 'V8' wa Naze Hayai noka", Nikkei Electronics, Nov. 3, 2008, No. 990, pp. 61-73.

\* cited by examiner

FIG.6

| GUI OBJECT IDENTIFIER | X COORDINATE | Y COORDINATE | WIDTH | HEIGHT |
|---|---|---|---|---|
| ID1 | 100 | 100 | 70 | 20 |
| ID2 | 300 | 150 | 110 | 30 |
| ID3 | 215 | 630 | 110 | 30 |
| ⋮ | ⋮ | ⋮ | | |

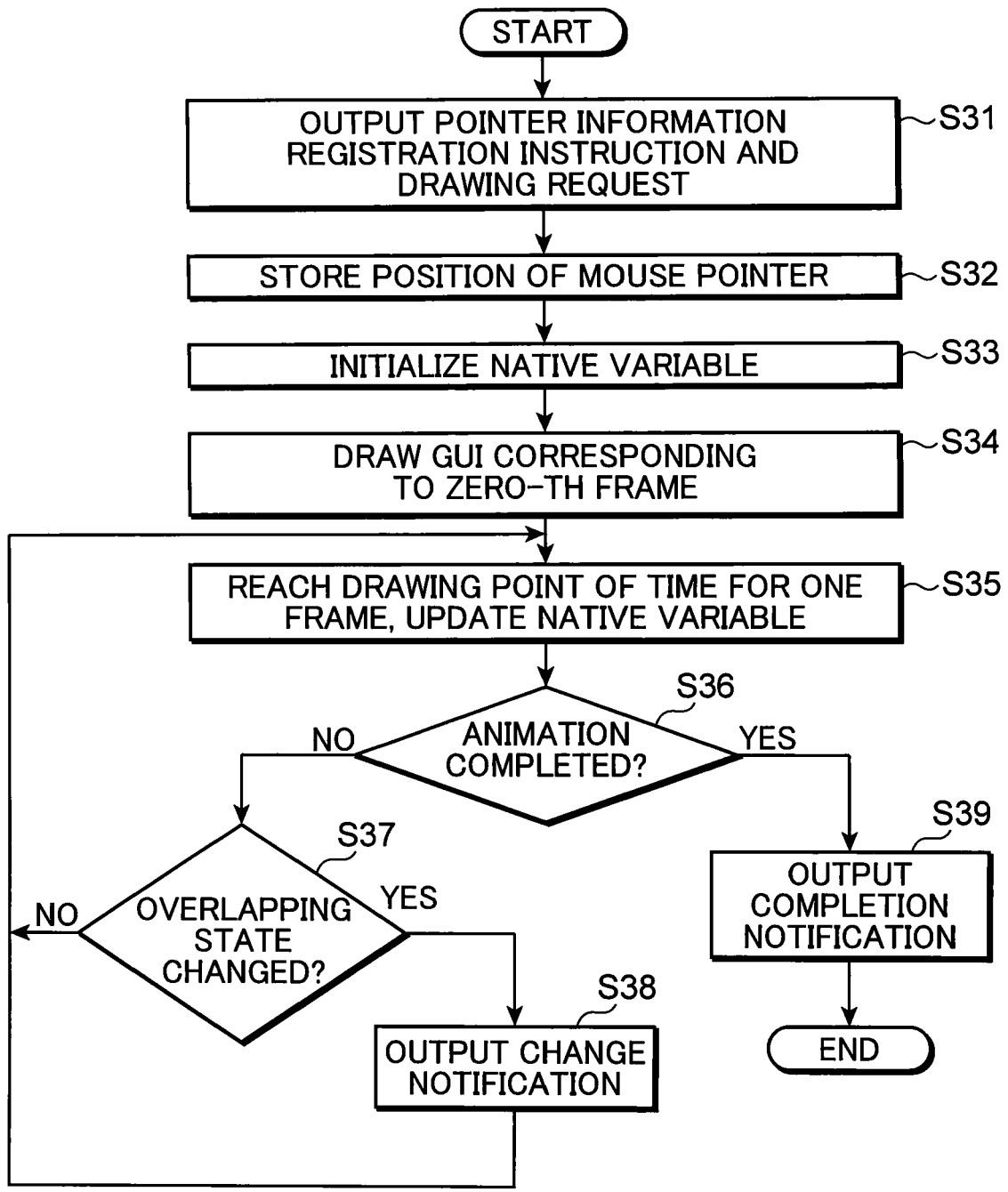

FIG.13

```
1.    <HTML>
2.    <HEAD>
3.    <TITLE>Sample script</TITLE>
4.    <SCRIPT type="text/JavaScript">
5.    <!--
6.    var waitTime = 100;
7.
8.    function Twodim(x, y)
9.    {
10.       this.x = x;
11.       this.y = y;
12.   }
13.
14.   var endPos = new Twodim();
15.   var delta = new Twodim();
16.
17.   function sample()
18.   {
19.     obj.style.top = 100;
20.     obj.style.left = 100;
21.     endPos.x = 200;
22.     endPos.y = 100;
23.     delta.x = 5;
24.     delta.y = 0;
25.     anime("obj", endPos, delta, done);
26.   }
27.
28.   function done()
29.   {
30.     document.write("DONE!");
31.   }
32.
33.   function anime(objName, ep, d, df)
34.   {
35.     nativeAnime(objName, ep, d, df);
36.   }
37.   //-->
38.   </SCRIPT>
39.   </HEAD>
40.   <BODY onLoad="sample()">
41.   <p id="obj" style="position:absolute">SAMPLE</p>
42.   </BODY>
43.   </HTML>
```

FIG.14

```
1.    <HTML>
2.    <HEAD>
3.    <TITLE>Prior art sample script</TITLE>
4.    <SCRIPT type="text/JavaScript">
5.    <!--
6.    var waitTime = 100;
7.
8.    function Twodim(x, y)
9.    {
10.       this.x = x;
11.       this.y = y;
12.   }
13.
14.   var endPos = new Twodim();
15.   var delta = new Twodim();
16.
17.   function sample()
18.   {
19.     obj.style.top = 100;
20.     obj.style.left = 100;
21.     endPos.x = 200;
22.     endPos.y = 100;
23.     delta.x = 5;
24.     delta.y = 0;
25.     anime("obj", endPos, delta, done);
26.   }
27.
28.   function done()
29.   {
30.     document.write("DONE!");
31.   }
32.
33.   function anime(objName, ep, d, df)
34.   {
35.     var epx = ep.x;
36.     var epy = ep.y;
37.     var dx = d.x;
38.     var dy = d.y;
39.     moveObj(objName, epx, epy, dx, dy, df);
40.   }
41.
42.   function moveObj(objName, epx, epy, dx, dy, df)
43.   {
44.     var o = document.getElementById(objName);
45.     o.style.left = parseInt(o.style.left) + dx;
46.     o.style.top = parseInt(o.style.top) + dy;
47.     if(parseInt(o.style.left) < epx || parseInt(o.style.top) < epy)
48.     {
49.       setTimeout("moveObj('" + objName + "', " + epx + ", " + epy + ", " +
50.         dx + ", " + dy + ", " + df + ")", waitTime);
51.     }
52.     else
53.     {
54.       df();
55.     }
56.   }
57.   //-->
58.   </SCRIPT>
59.   </HEAD>
60.   <BODY onLoad="sample()">
61.   <p id="obj" style="position:absolute">SAMPLE</p>
62.   </BODY>
63.   </HTML>
```

ANIMATION DRAWING DEVICE, COMPUTER-READABLE RECORDING MEDIUM, AND ANIMATION DRAWING METHOD

TECHNICAL FIELD

The present invention relates to a technology of animation-displaying a graphical user interface (GUI) by executing script data described in an interpreter script language.

BACKGROUND ART

In recent years, a graphical user interface (GUI) allows for animation display, as the processing performance of a computer is improved, and a web browser function using a script language is improved. Therefore, generally, recently available web browsers are internally provided with an animation drawing function of animation-displaying a GUI.

Such a web browser sequentially executes script data described in an interpreter script language for animation-displaying a GUI. For instance, patent literature 1 discloses a technology of executing script data for animation-displaying a GUI. FIG. 15 is a block diagram showing a general configuration of a conventional animation drawing device 70 for animation-displaying a GUI by executing script data, as disclosed in patent literature 1.

The animation drawing device 70 shown in FIG. 15 is provided with a script data storage 701, an interpreter 702, a graphics drawing controller 703, and a graphics processor 704. A display device 71 is a device for displaying an animation to be drawn by the animation drawing device 70. The script data storage 701 stores script data for animation-displaying a GUI. In this example, the script data is data described in an interpreter script language, and is described in e.g. the JavaScript (trademark).

The script data describes data for defining attribute information of GUI objects constituting a GUI for animation, and animation drawing instructions for animation-displaying the GUI.

The attribute information is data for defining various parameters such as the coordinate, the size, the enlargement/reduction ratio, the rotation rate (roll angle, pitch angle, yaw angle), the color, the transmittance, and the image of a GUI object to be displayed. For instance, in the case where an animation of linearly moving a GUI object on the screen of the display device 71 is implemented, there is described, in the script data, a loop processing of setting a coordinate representing a start point and a coordinate representing an end point as variables, and moving the GUI object little by little by changing the variables little by little.

The interpreter 702 sequentially interprets the script data, and outputs a graphics drawing instruction to the graphics drawing controller 703, each time the script data is interpreted.

The graphics drawing controller 703 breaks down the graphics drawing instruction sent from the interpreter 702 into low-level drawing commands executable by the graphics processor 704, and outputs the drawing commands to the graphics processor 704. The graphics drawing controller 703 is constituted of a software, and is generally called as a graphics library or a device driver.

The graphics processor 704 executes a drawing command outputted from the graphics drawing controller 703, and generates a graphics by drawing a frame in a built-in frame buffer. The graphics processor 704 is constituted of a hardware such as a graphics processing unit (GPU).

FIG. 16 is a diagram conceptually showing a structure of script data 701a to be described in the case where the conventional animation drawing device 70 is used. FIG. 16 shows that the script data 701a includes an animation control program 7011 described for animation-displaying a GUI.

Since the animation control program 7011 is described in an interpreter script language, the interpreter 702 is required to frequently execute a retrieval processing. The retrieval processing obstructs an increase in the execution speed of the animation drawing device 70 in animation-displaying the GUI.

There is known, as an approach of increasing the execution speed in animation-displaying a GUI, an approach of replacing the animation processing described in the script language with a native program described in a native language. In this approach, the script data 701a calls out an API of the native program via the interpreter 702 to cause the API to execute the animation processing. As is well known in the art, a program described in a native language requires a short processing time, as compared with a program described in a script language. Accordingly, the above replacement approach allows for increasing the execution speed of animation.

However, in the conventional approach, the program described in a native language is required to perform an animation processing including a step of acquiring variables from the interpreter 702. Consequently, the interpreter 702 is required to perform a variable retrieval processing in acquiring the variables, which may lower the execution speed of the GUI.

CITATION LIST

Patent Literature

Patent Literature 1: JP 2001-6001A

SUMMARY OF INVENTION

An object of the invention is to provide a technology that enables to increase the execution speed of a GUI.

An animation drawing device according to an aspect of the invention is an animation drawing device for animation-displaying a graphical user interface (GUI) by executing script data described in an interpreter script language. The animation drawing device includes an interpreter which sequentially interprets the script data by an interpreter method; and an animation controller which animation-displays the GUI by executing a program module described in a native language. The interpreter outputs a drawing request to the animation controller upon interpreting an animation drawing instruction defined with use of a predetermined script variable, and the animation controller converts the script variable into a native variable in the form of the native language upon receiving the drawing request, and animation-displays the GUI while sequentially updating the native variable.

A computer-readable recording medium which stores an animation drawing program according to another aspect of the invention is an animation drawing program which causes a computer to function as an animation drawing device for animation-displaying a graphical user interface (GUI) by executing script data described in an interpreter script language. The animation drawing program causes the computer to function as an interpreter which sequentially interprets the script data by an interpreter method; and an animation controller which animation-displays the GUI by executing a program module described in a native language. The interpreter outputs a drawing request to the animation controller upon interpreting an animation drawing instruction defined with use of a predetermined script variable, and the animation controller converts the script variable into a native variable in the form of the native language upon receiving the drawing request, and animation-displays the GUI while sequentially updating the native variable.

An animation drawing method according to yet another aspect of the invention is an animation drawing method for animation-displaying a graphical user interface (GUI) by executing script data described in an interpreter script language. The animation drawing method includes an interpreter step of causing an interpreter to sequentially interpret the script data by an interpreter method; and an animation control step of causing an animation controller to animation-display the GUI by executing a program module described in a native language. The interpreter step outputs a drawing request to the animation controller upon interpreting an animation drawing instruction defined with use of a predetermined script variable, and the animation control step converts the script variable into a native variable in the form of the native language upon receiving the drawing request, and animation-displays the GUI while sequentially updating the native variable.

BRIEF DESCRIPTION OF DRAWINGS

FIG. 6 is a diagram showing an attribute information table, in which attribute information described in script data is expressed in a table format in the embodiment of the invention.

FIG. 12 is a flowchart showing a processing to be performed by the animation drawing device in the second embodiment of the invention.

FIG. 13 is a diagram showing an example of script data to be used in the animation drawing devices in the first and second embodiments of the invention.

FIG. 14 is a diagram showing an example of script data used in a conventional GUI animation drawing device.

DESCRIPTION OF EMBODIMENTS

Figure 1:
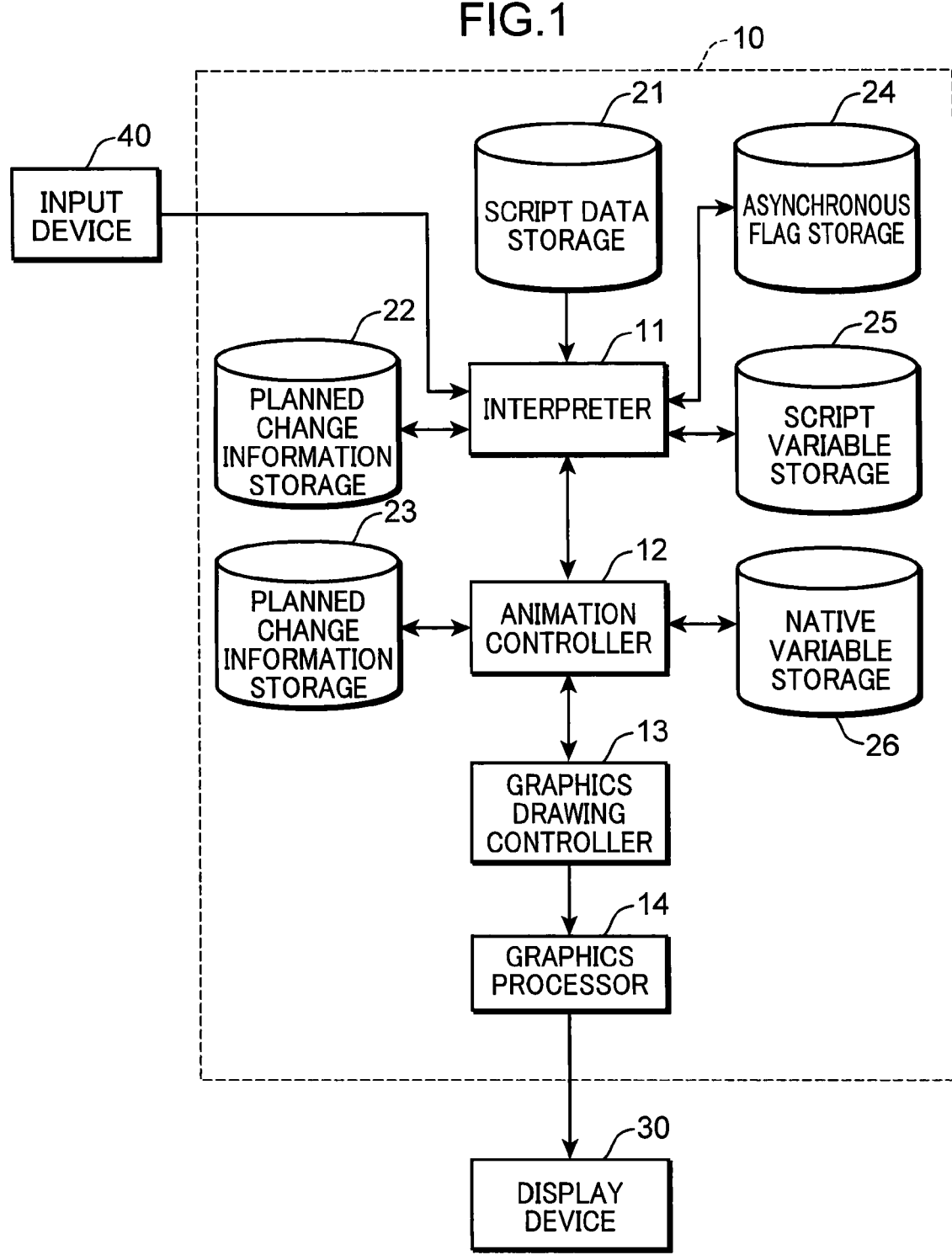
FIG. 1 is a configuration diagram of an animation drawing device in the first embodiment of the invention.

In the following, embodiments of the invention will be described referring to the drawings.

First Embodiment

FIG. 1 is a configuration diagram of an animation drawing device 10 in the first embodiment of the invention. The animation drawing device 10 shown in FIG. 1 is provided with an interpreter 11, an animation controller 12, a graphics drawing controller 13, a graphics processor 14, a script data storage 21, planned change information storages 22, 23, an asynchronous flag storage 24, a script variable storage 25, and a native variable storage 26.

The interpreter 11 sequentially interprets script data for use in animation-displaying a GUI stored in the script data storage 21 by an interpreter method. In this embodiment, the interpreter 11 outputs a drawing request to the animation controller 12, upon interpreting an animation drawing instruction defined with use of a predetermined script variable.

The animation controller 12 animation-displays a GUI by executing a program module described in a native language. In this embodiment, the animation controller 12 converts a script variable into a native variable in the form of a native language upon receiving a drawing request from the interpreter 11, and animation-displays a GUI while updating the native variable.

As described above, the animation controller 12 is operable to animation-display a GUI while sequentially updating a native variable independently of a script variable. This arrangement eliminates the need of acquiring a variable from the interpreter 11 during animation by the animation controller 12, and eliminates the need of performing a retrieval processing for the interpreter 11 when the animation controller 12 acquires a variable. Thus, the arrangement is advantageous in increasing the execution speed of animation.

Specifically, in executing a program module described in a native language, a native variable, which is a copy of a script variable, is substituted in the program module. In this example, attribute information of GUI objects is used as a script variable for GUI animation.

A program module described in a native language frequently accesses the attribute information of GUI objects during animation. However, since the attribute information of a native variable is accessed, a time required for accessing is remarkably short, as compared with a case where attribute information described in a script language is accessed. Accordingly, the execution speed of animation can be increased. A machine language is used as the native language. Further, for instance, a hash retrieval whose processing load is high is used as the retrieval processing to be performed by the interpreter 11.

Further, the animation controller 12 generates planned change information representing a state of the GUI at one or more drawing points of time during a period from start to finish of animation, based on a script variable. Then, when a drawing point of time as represented by the planned change information is reached, the animation controller 12 outputs a native variable at the drawing point of time.

If the script variable does not reflect updating of the native variable despite the updating of the native variable, the interpreter 11 cannot grasp the native variable during animation, and cannot grasp the attribute information of GUI objects.

On the other hand, if the animation controller 12 notifies the interpreter 11 of a native variable each time the animation controller 12 updates the native variable, the interpreter 11 can grasp a current state of animation, because the script variable is synchronized with the native variable. However, such a control requires frequent data sending/receiving between the animation controller 12 and the interpreter 11, and increases the processing load of the animation controller 12, which may resultantly lower the execution speed of animation against the intention.

In view of the above, in this embodiment, the animation controller 12 outputs a native variable to the interpreter 11 only in the case where a drawing point of time as represented by the planned change information is reached. This arrangement remarkably reduces the number of times of data sending/receiving between the animation controller 12 and the interpreter 11, thereby preventing lowering of the execution speed of animation.

Further, the animation controller 12 outputs a completion notification to the interpreter 11 upon finishing animation. This allows the interpreter 11 to recognize that the animation has been finished.

Further, the animation controller 12 causes the planned change information storage 23 to store the planned change information therein, and outputs the planned change information to the interpreter 11. In performing this operation, the interpreter 11 causes the planned change information 22 to store the outputted planned change information therein.

As described above, causing both the planned change information storages 22 and 23 to store planned change information is advantageous in reducing the amount of data to be sent/received between the interpreter 11 and the animation controller 12 and in reducing the processing load of the animation controller 12 and the interpreter 11.

In this example, the planned change information storage 22 is constituted of a storage area or a storage device accessible by the interpreter 11, and the planned change information storage 23 is constituted of a storage area or a storage device accessible by the animation controller 12.

Further, the animation controller 12 updates the native variable e.g. each time a drawing point of time for one frame is reached, outputs, to the graphics drawing controller 13, a drawing instruction for causing the graphics drawing controller 13 to draw a next frame in accordance with the updated native variable, and causes the graphics drawing controller 13 to perform a GUI drawing processing for one frame. Further, the animation controller 12 receives a completion notification from the graphics drawing controller 13 each time a drawing processing for one frame is completed.

Upon receiving a drawing instruction from the animation controller 12, the graphics drawing controller 13 breaks down the drawing instruction into low-level drawing commands executable by the graphics processor 14, and outputs the graphics commands to the graphics processor 14. In this example, the graphics drawing controller 13 is generally called as a graphics library or a device driver.

The graphics processor 14 executes a drawing command outputted from the graphics drawing controller 13, and generates a graphics by drawing a frame in a built-in frame buffer.

When animation is started, the interpreter 11 activates an asynchronous flag indicating that a script variable is not synchronized with a native variable. Then, upon receiving a completion notification from the animation controller 12, the interpreter 11 deactivates the asynchronous flag. In the case where a predetermined input event has occurred in response to user's manipulation of an input device 40 while the asynchronous flag is being deactivated, the interpreter 11 executes a synchronization processing of causing the animation controller 12 to output a native variable.

For instance, let us assume a case, wherein an input event has occurred in response to user's clicking of a mouse during animation of moving a GUI object. Since a script variable and a native variable are not synchronized with each other during animation, the interpreter 11 cannot recognize the current position of the GUI object, and it is impossible to judge whether the mouse pointer overlaps the GUI object when the user has clicked the mouse.

In view of the above, this embodiment is configured in such a manner that in the case where an input event has occurred, the interpreter 11 causes the animation controller 12 to forcibly output a current native variable for synchronizing between the script variable and the native variable. With this configuration, the interpreter 11 is operable to recognize the current position of the GUI object, and judge whether the mouse pointer overlaps the GUI object when the input event has occurred. In the case where it is judged that the mouse pointer overlaps the GUI object, the interpreter 11 executes a processing that will occur in response to clicking the GUI object in accordance with the script data.

The interpreter 11 converts a native variable outputted from the animation controller 12 into a script variable, and updates the script variable that has been currently stored in the script variable storage 25 into the converted script variable. Further, the interpreter 11 stores e.g. data "1" in the asynchronous flag storage 24 when the asynchronous flag is activated, and stores e.g. data "0" in the asynchronous flag storage 24 when the asynchronous flag is deactivated.

The script data storage 21 stores script data for animation-displaying a GUI. In this example, the script data is data described in an interpreter script language, and for instance, is described in e.g. the JavaScript (trademark). The script data includes data for defining attribute information of GUI objects constituting a GUI for animation, and animation drawing instructions for animation-displaying a GUI.

The planned change information storage 22 stores planned change information which has been outputted from the animation controller 12 and received by the interpreter 11. In this example, the planned change information stored in the planned change information storage 22 is e.g. planned change information converted into a script variable by the interpreter 11.

The planned change information storage 23 stores planned change information generated by the animation controller 12. In this example, the planned change information stored in the planned change information storage 23 is planned change information on a native variable.

FIG. 6 is a diagram showing an attribute information table TB1, in which attribute information described in the script data in the first embodiment of the invention is expressed in the form of a table. As shown in FIG. 6, the attribute information table TB1 is provided with columns on GUI object identifier, X-coordinate, Y-coordinate, width, and height. FIG. 6 shows that the attribute information of each of the GUI objects includes the aforementioned data. The data constituting the attribute information shown in FIG. 6 is merely an example of data required in implementing an animation in which the coordinate changes. The invention is not limited to the data shown in FIG. 6. For instance, in the case where animation in which the color or the transparency changes is applied, the color and the transparency may be included in the attribute information.

The GUI object identifier is constituted of a character string uniquely allocated to each of the GUI objects for identifying each of the GUI objects. The X-coordinate and the Y-coordinate indicate a display position of a GUI object. In the example shown in FIG. 6, for instance, the uppermost and leftmost vertex on the screen of the display device 30 serves as an origin point, the Y-coordinate is defined downward in a vertical direction, and the X-coordinate is defined rightward in a horizontal direction. Thus, the X-coordinate and the Y-coordinate indicate the position of each pixel of a GUI object on the screen.

The width indicates the size of a GUI object in a horizontal direction. The height indicates the size of a GUI object in a vertical direction. In the following description, there is described an example of animation which causes the GUI object identifier described in the column R1 of the first row to move and display the GUI object identified by "ID1".

Figure 9:
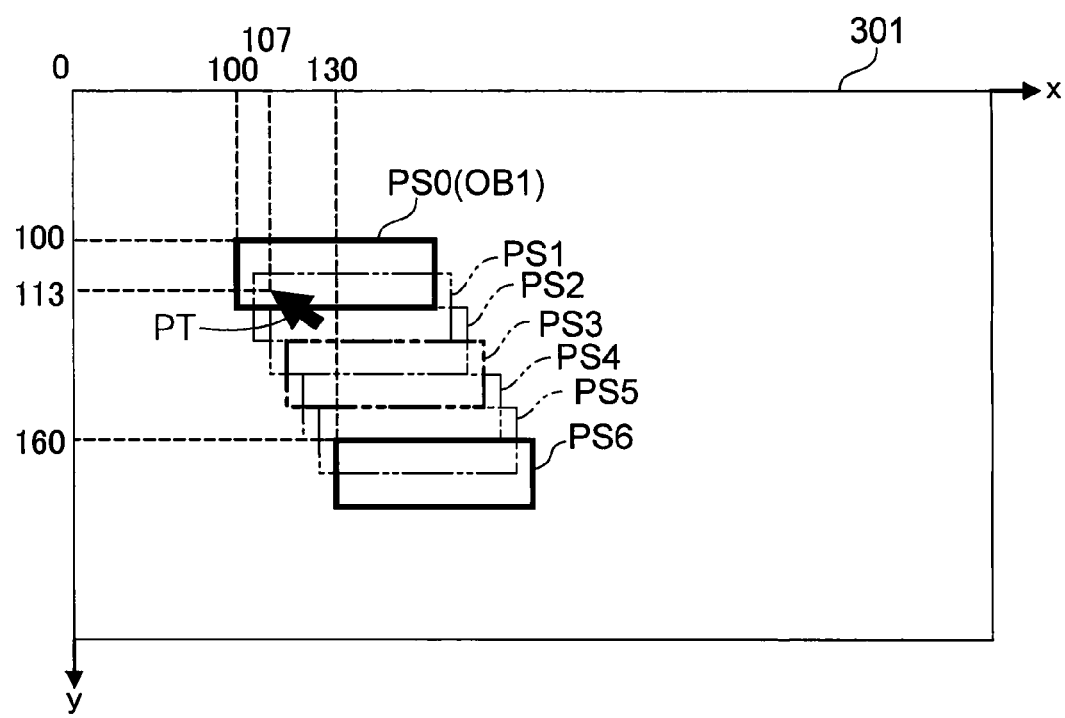
FIG. 9 is a screen diagram showing a GUI to be animation-displayed on a screen of a display device in accordance with the script data in the embodiment of the invention.

FIG. 9 is a screen diagram showing a GUI to be animation-displayed on a screen 301 of the display device 30 in accordance with the script data in this embodiment of the invention. The GUI is designed to move a GUI object OB1 obliquely rightward and downward. The GUI object OB1 is a GUI object whose GUI object identifier shown in FIG. 6 is ID1.

When animation is started, the GUI object OB1 is located at a position PS0. Thereafter, the GUI object OB1 is moved obliquely rightward and downward to positions PS1, PS2, PS3, PS4, PS5 each time the frame is updated, and the GUI object OB1 is finally moved to a position PS6. A mouse pointer PT is moved on the screen 301 in response to user's manipulation of the input device 40.

Figure 8:
FIG. 8 is a diagram showing an example of planned change information in the first embodiment of the invention.

Referring to FIG. 9, the third frame, in which the GUI object OB1 is located at the position PS3, corresponds to a drawing point of time as represented by a timestamp of planned change information shown in FIG. 8. At this drawing point of time, the animation controller 12 outputs a native variable including the coordinate of the object OB1 to the interpreter 11. In this example, for instance, the coordinate at the uppermost and leftmost vertex of the GUI object OB1 is used as the coordinate of the GUI object OB1. However, the above is merely an example, and the coordinate at the uppermost and rightmost vertex, the coordinate at the lowermost and rightmost vertex, the coordinate at the lowermost and leftmost vertex, or the coordinate at the center of the GUI object OB1 may be used.

Figure 7:
FIG. 7 is a diagram showing an example of a script variable to be outputted from an interpreter to an animation controller as a drawing request when animation is started.

FIG. 7 is a diagram showing an example of attribute information Z1 constituting a script variable to be outputted from the interpreter 11 to the animation controller 12 as a drawing request when animation is started. The attribute information Z1 includes columns for storing GUI object identifiers, start points, end points, and change amounts. The GUI object identifier is an identifier of a GUI object for animation. In the example shown in FIG. 7, ID1 is stored in the column of GUI object identifier. FIG. 7 shows that the attribute information Z1 includes attribute information on the GUI object OB1 shown in FIG. 9. In the case where there are plural GUI objects for animation, the attribute information Z1 includes attribute information relating to the GUI objects. The attribute information Z1 is described in advance in the script data.

The start point indicates the position of a GUI object at the point of time when animation is started. In the example shown in FIG. 7, since X-coordinate=100, Y-coordinate=100 are defined as the start point, as shown in FIG. 9, the GUI object OB1 is displayed at the position PS0 where X-coordinate=100, Y-coordinate=100 at the point of time when animation is started.

The end point indicates the position of a GUI object at the point of time when animation is finished. In the example shown in FIG. 7, since X-coordinate=130, Y-coordinate=160 are defined, the GUI object OB1 is displayed at the position PS6 where X-coordinate=130, Y-coordinate=160 at the point of time when animation is finished.

The change amount is a value indicating an amount by which the position of a GUI object is to be changed each time the animation processing proceeds by one frame. In the example shown in FIG. 7, since X-component=5, Y-component=10 are defined as the change amount, the GUI object OB1 changes in such a manner that the X-coordinate is incremented by five and the Y-coordinate is incremented by ten, each time the animation processing proceeds by one frame. The unit of change amount is pixel.

FIG. 8 is a diagram showing an example of planned change information IF1 in the first embodiment of the invention. The planned change information IF1 is provided with columns for storing timestamps, X-coordinates, and Y-coordinates. The example of the planned change information IF1 shown in FIG. 8 includes the positions of the GUI object OB1 at three drawing points of time.

The timestamp indicates a drawing point of time at which the animation controller 12 notifies the interpreter 11 of a native variable. In this embodiment, the timestamp indicates a value corresponding to the frame which is currently drawn, assuming that the frame to be displayed at the point of time when animation is started is a zero-th frame. In the example shown in FIG. 8, since the values 0, 3, 6 are defined as the timestamps, the animation controller 12 outputs, to the interpreter 11, the positions of the GUI object OB1 at the zero-th frame, the third frame, the sixth frame from the point of time when animation is started. Since the zero-th frame indicates the point of time when animation is started, and the sixth frame indicates the point of time when animation is finished, the animation controller 12 may be inoperative to output the position of the GUI object OB1.

In this example, the planned change information IF1 is generated by the animation controller 12 in the following manner. Firstly, at the point of time when animation is started, the animation controller 12 receives, from the interpreter 11, a script variable including the attribute information in the column R1 shown in FIG. 6 and the attribute information Z1 shown in FIG. 7.

Then, the animation controller 12 generates the position of the GUI object OB1 at a predetermined timestamp, referring to the attribute information Z1 shown in FIG. 7. In the example of FIG. 8, since the values 0, 3, 6 are defined as the predetermined timestamps, the animation controller 12 generates the planned change information IF1 shown in FIG. 8 by obtaining the positions of the GUI object OB1 at the third frame and at the sixth frame, based on the start point and the change amount shown in FIG. 7. Then, the animation controller 12 notifies the interpreter 11 of the generated planned change information IF1, and causes the planned change information storage 23 to store the generated planned change information IF1. Further, the interpreter 11 causes the planned change information storage 22 to store the notified planned change information IF1.

Referring to FIG. 8, there has been described an example, wherein three timestamps are used. The invention is not limited to the above, but two or more than three predetermined values may be used as predetermined timestamps. In the modification, the animation controller 12 may obtain the position of the GUI object OB1 at each of the timestamps, using the start point and the change amount shown in FIG. 7.

Referring back to FIG. 1, the asynchronous flag storage 24 stores an asynchronous flag to be set by the interpreter 11. The script variable storage 25 stores a script variable which is managed by the interpreter 11, and which is a script variable other than the planned change information. The native variable storage 26 stores a native variable which is sequentially updated by the animation controller 12, and which is a native variable other than the planned change information. The display device 30 is constituted of a plasma display or a liquid crystal display, and displays an animation to be drawn by the animation drawing device 10.

Figure 2:
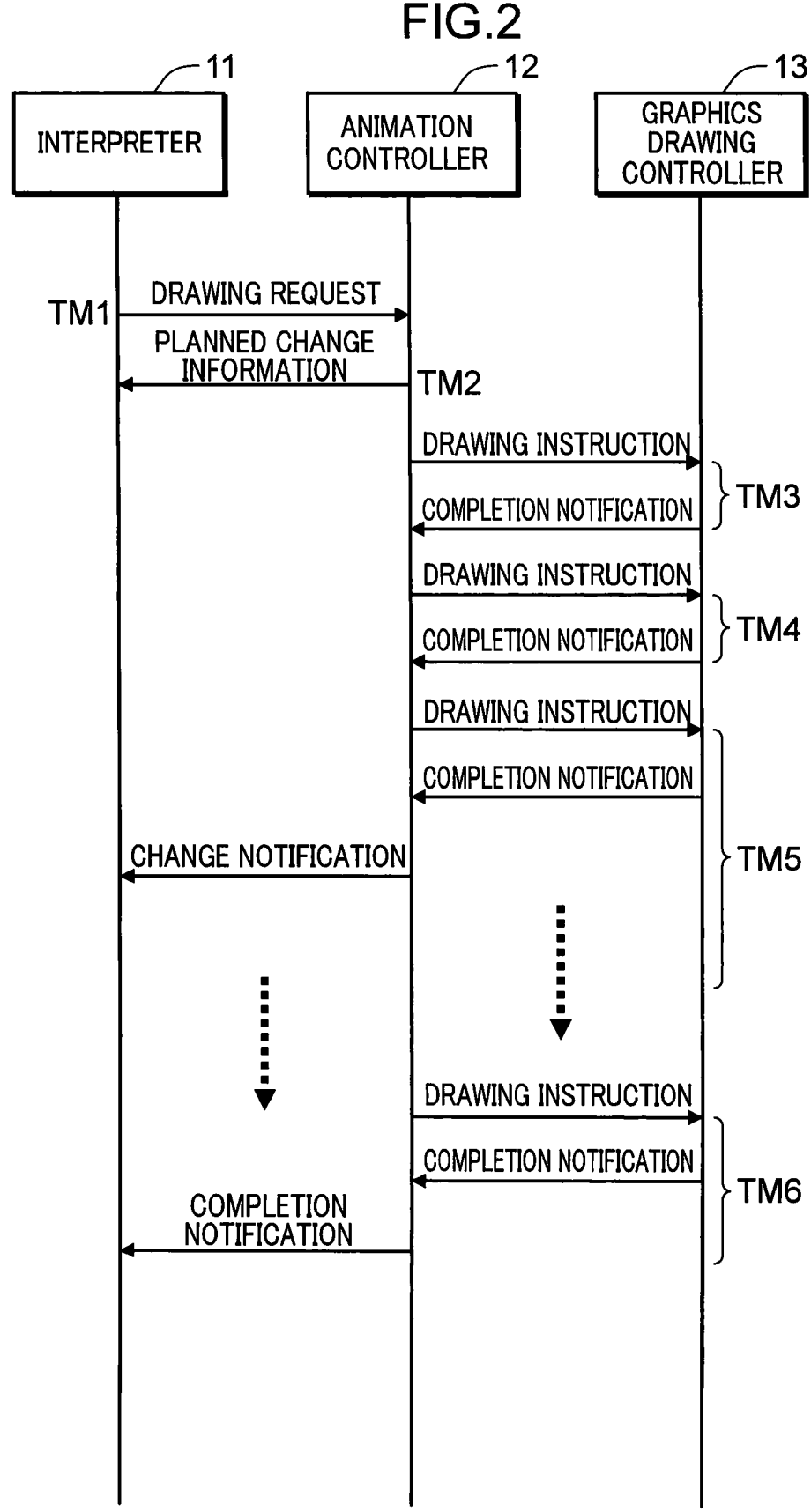
FIG. 2 is a timing chart showing data sending/receiving between constituent elements of the animation drawing device in the first embodiment of the invention.

FIG. 2 is a timing chart showing data sending/receiving between the constituent elements of the animation drawing device 10 in the first embodiment of the invention.

Firstly, upon occurrence of an input event for animation-displaying a GUI, the attribute information described in the column R1 shown in FIG. 6 and the attribute information Z1 shown in FIG. 7 are included in the script variable, and the script variable is outputted to the animation controller 12 as a drawing request (at the timing TM1).

Then, upon receiving the drawing request, the animation controller 12 generates the planned change information IF1, and outputs the generated planned change information IF1 to the interpreter 11 (at the timing TM2). Then, the animation controller 12 outputs a drawing instruction to the graphics drawing controller 13 each time a drawing point of time for one frame is reached (at the timings TM3 through TM5).

The graphics drawing controller 13 generates a low-level drawing command executable by the graphics processor 14 each time a drawing instruction is received, and causes the graphics processor 14 to draw a GUI corresponding to one frame. Then, upon completion of drawing the GUI corresponding to one frame, the graphics drawing controller 13 outputs a completion notification to the animation controller 12.

The timing TM5 corresponds to a drawing point of time as represented by the timestamp of the planned change information IF1. Therefore, at the timing TM5, the animation controller 12 outputs a current native variable to the interpreter 11 as a change notification.

By repeating the above processing, a GUI is animation-displayed. Then, in response to output of a completion notification to a drawing instruction for a last frame from the graphics drawing controller 13, the animation controller 12 outputs a completion notification indicating that the animation has been finished to the interpreter 11 (at the timing TM6).

Figure 3:
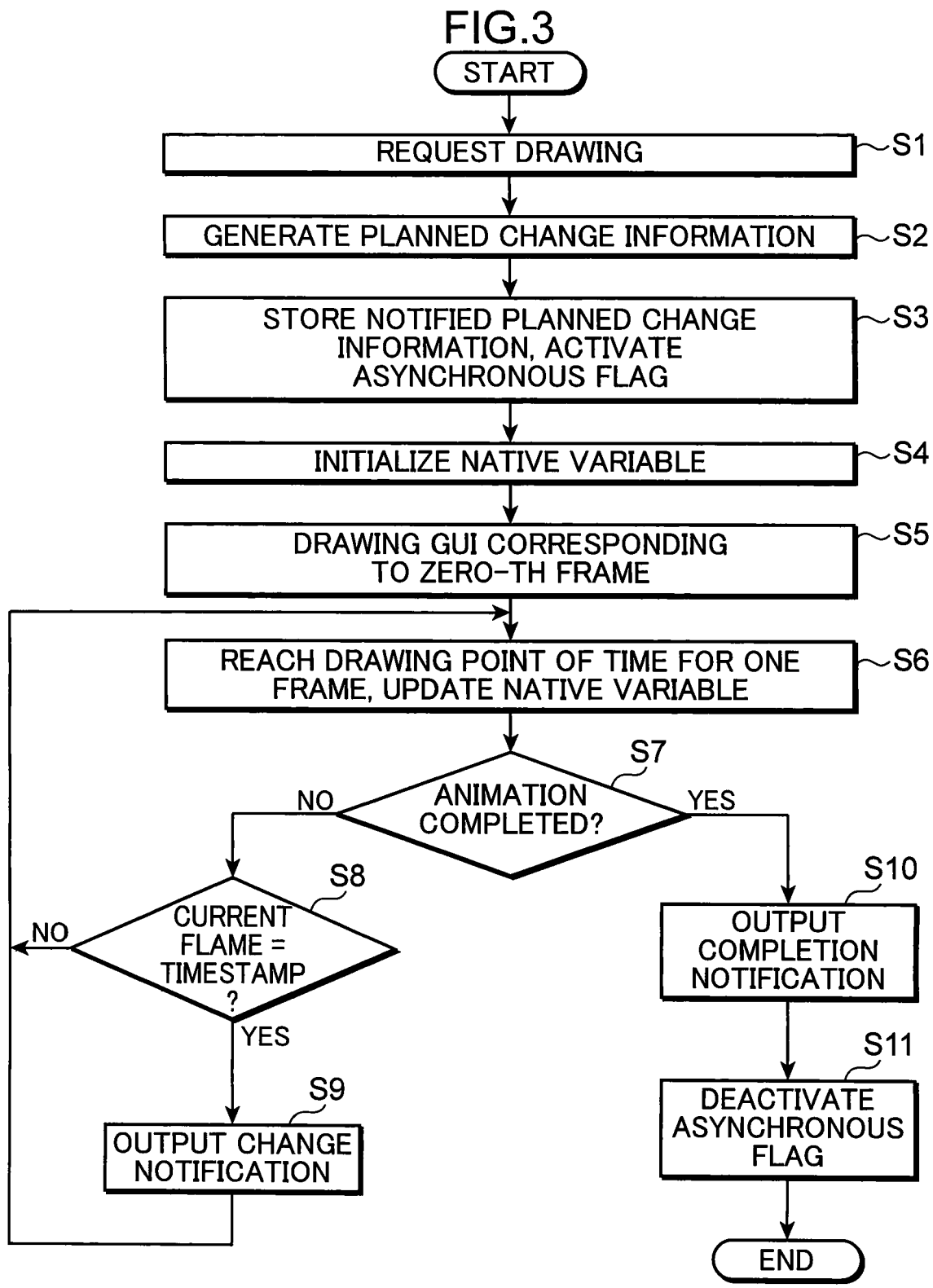
FIG. 3 is a flowchart showing a processing to be performed by the animation drawing device in the first embodiment of the invention.

FIG. 3 is a flowchart showing a processing to be performed by the animation drawing device 10 in the first embodiment of the invention. In Step S1, the interpreter 11 sequentially interprets script data, and outputs a drawing request to the animation controller 12 upon interpreting an animation drawing instruction. In this example, the interpreter 11 outputs a script variable including the attribute information shown in the column R1 in FIG. 6 and the attribute information Z1 shown in FIG. 7, as a drawing request. Further, the interpreter 11 causes the script variable storage 25 to store the script variable outputted to the animation controller 12.

Then, the animation controller 12 generates the planned change information IF1 shown in FIG. 8, based on the script variable (Step S2), and causes the planned change information storage 23 to store the generated planned change information IF1 and outputs the generated planned change information IF1 to the interpreter 11.

Then, the interpreter 11 converts the planned change information IF1 outputted from the animation controller 12 into a script variable, causes the planned change information storage 22 to store the script variable therein, and activates an asynchronous flag (Step S3).

Then, the animation controller 12 converts the script variable outputted from the interpreter 11 as a drawing request into a native variable for initializing the native variable (Step S4). The native variable conceptually has the same content as the attribute information shown in the column R1 in FIG. 6 and the attribute information Z1 shown in FIG. 7.

Then, the animation controller 12 outputs a drawing instruction for drawing a GUI corresponding to the zero-th frame to the graphics drawing controller 13 (Step S5). By performing the above operation, the graphics drawing controller 13 outputs a drawing command to the graphic processor 14, whereby the GUI corresponding to the zero-th frame is displayed on the display device 30.

In other words, the animation controller 12 outputs a drawing instruction to the graphics drawing controller 13 so that the GUI object OB1 is drawn at the position PS0, as shown in FIG. 9, because the start point of the attribute information Z1 shown in FIG. 7 is represented by the X-coordinate=100, the Y-coordinate=100.

Then, when the drawing point of time for one frame is reached, the animation controller 12 updates the native variable for drawing a next frame, outputs a drawing instruction reflecting the updated native variable to the graphic drawing controller 13, and sleeps for a predetermined time (Step S6). In this example, the predetermined time may be a period from the point of time when the animation controller 12 outputs a drawing instruction to the point of time when the graphics drawing controller 13 outputs a completion notification indicating completion of drawing one frame. In other words, the animation controller 12 is released from the sleeping state by the completion notification to be outputted from the graphics drawing controller 13.

Further, the animation controller 12 calculates the position (X-coordinate=105, Y-coordinate=110) of the GUI object OB1 corresponding to the first frame by respectively adding an X-component=5, a Y-component=10 of the change amount to the X-coordinate=100, the Y-coordinate=100 at the start point of the native variable that has been converted in Step S4, and includes the calculated position in the native variable for updating the native variable. In this case, for instance, the animation controller 12 may define the native variable by including the column for storing the current position of the GUI object OB1 in the attribute information Z1 shown in FIG. 7.

Then, in the second frame and thereafter, the animation controller 12 respectively adds the X-component=5, the Y-component=10 of the change amount to the X-coordinate, the Y-coordinate at a current position of the GUI object OB1 each time the animation processing proceeds by one frame for updating the native variable.

Then, the animation controller 12 judges whether the animation has been finished (Step S7). In this example, the animation controller 12 judges that the animation has been finished, in the case where the current position of the native variable coincides with the end point shown in FIG. 7.

Then, in the case where the animation controller 12 judges that the animation has not been finished (NO in Step S7), the animation controller 12 judges whether the current frame corresponds to the frame as represented by the timestamp of the planned change information IF1 (Step S8). Specifically, in the case where the current frame corresponds to the third frame, the animation controller 12 judges that the judgment result in Step S8 is affirmative, outputs the current native variable to the interpreter 11 as a change notification (Step S9), and returns the processing to Step S6. By performing the above operation, synchronization between the script variable and the native variable is established, whereby the interpreter 11 is operable to recognize the current position of the GUI object OB1.

Upon receiving the change notification, the interpreter 11 converts the native variable into a script variable, includes the column on the current position in the attribute information Z1 shown in FIG. 7, and writes the current position of the GUI object OB1 in the column for updating the script variable.

On the other hand, in the case where the current frame does not correspond to the frame as represented by the timestamp of the planned change information IF1, in other words, in the case where the current frame does not correspond to the third frame, the animation controller 12 judges that the judgment result in Step S8 is negative, and returns the processing to Step S6.

In Step S7, in the case where the animation controller 12 judges that the animation has been finished (YES in Step S7), the animation controller 12 outputs a completion notification to the interpreter 11 (Step S10). Then, the interpreter 11 deactivates the asynchronous flag (Step S11), and terminates the processing.

By performing the above processing, the animation controller 12 outputs a native variable to the interpreter 11 in a frame represented by the timestamp, in place of outputting a native variable to the interpreter 11 for each frame. This arrangement reduces a processing load, and is advantageous in preventing lowering of the execution speed of GUI animation.

Figure 4:
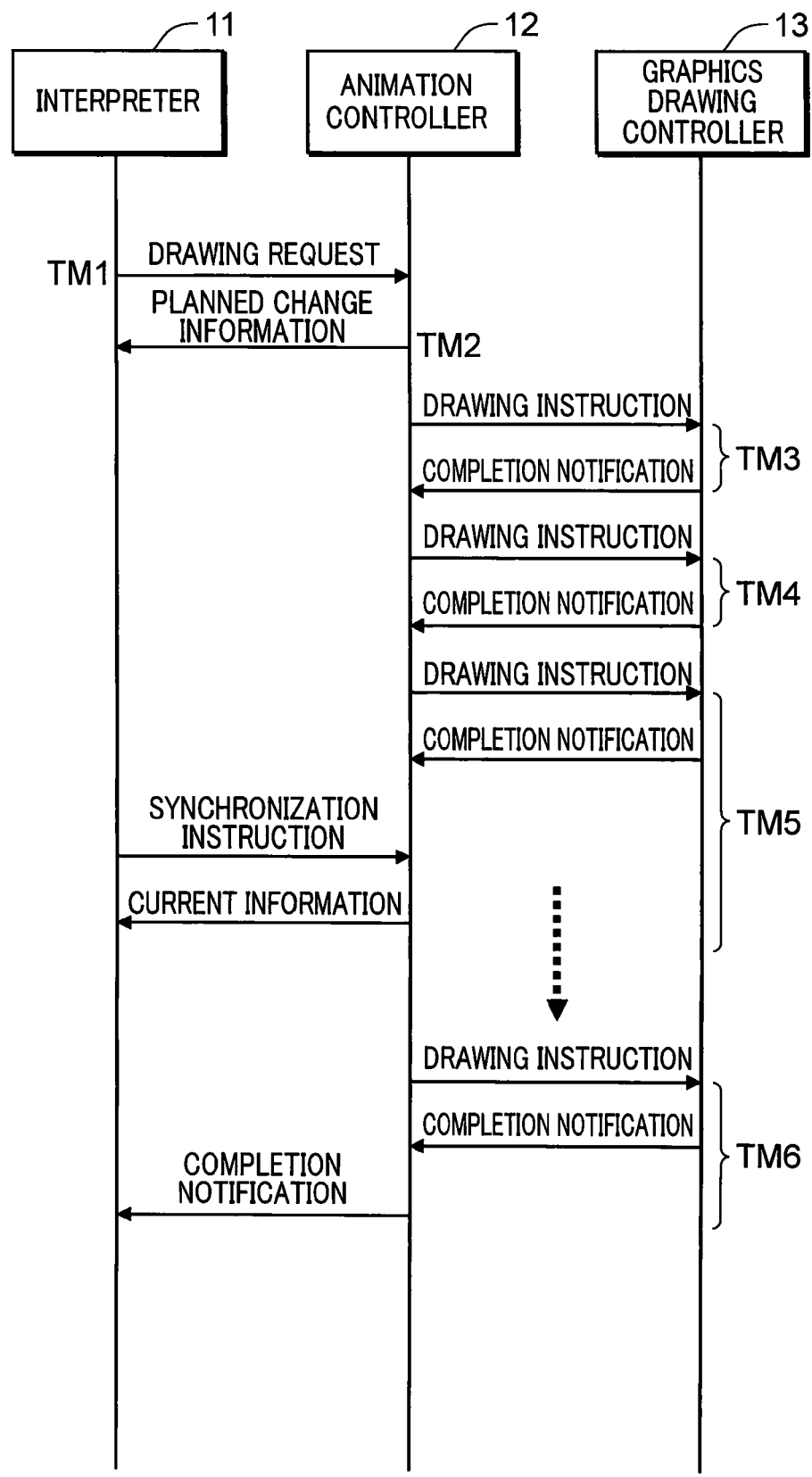
FIG. 4 is a timing chart showing data sending/receiving between constituent elements of an animation drawing device as a modification of the first embodiment of the invention.

FIG. 4 is a timing chart showing data sending/receiving between the constituent elements of an animation drawing device 10 as a modification of the first embodiment of the invention. Referring to FIG. 2, the animation controller 12 outputs a native variable to the interpreter 11 as a change notification at a drawing point of time as represented by a timestamp.

In the modification shown in FIG. 4, the animation controller 12 outputs a native variable to the interpreter 11 upon receiving a synchronization instruction from the interpreter 11.

Since the timings TM1 through TM4, TM6 shown in FIG. 4 are the same as those in FIG. 2, description thereof is omitted herein. The interpreter 11 outputs a synchronization instruction to the animation controller 12. This is because an input event in response to user's clicking of a mouse has occurred during animation-displaying the GUI object OB1.

Upon receiving the synchronization instruction, the animation controller 12 outputs, to the interpreter 11, a native variable including the current position of the GUI object OB1, as current information.

Upon receiving the current information, the interpreter 11 converts the native variable into a script variable for updating the script variable. By performing the above operation, the value of the script variable is made equal to the value of the native variable, whereby the script variable and the native variable are synchronized with each other.

Figure 5:
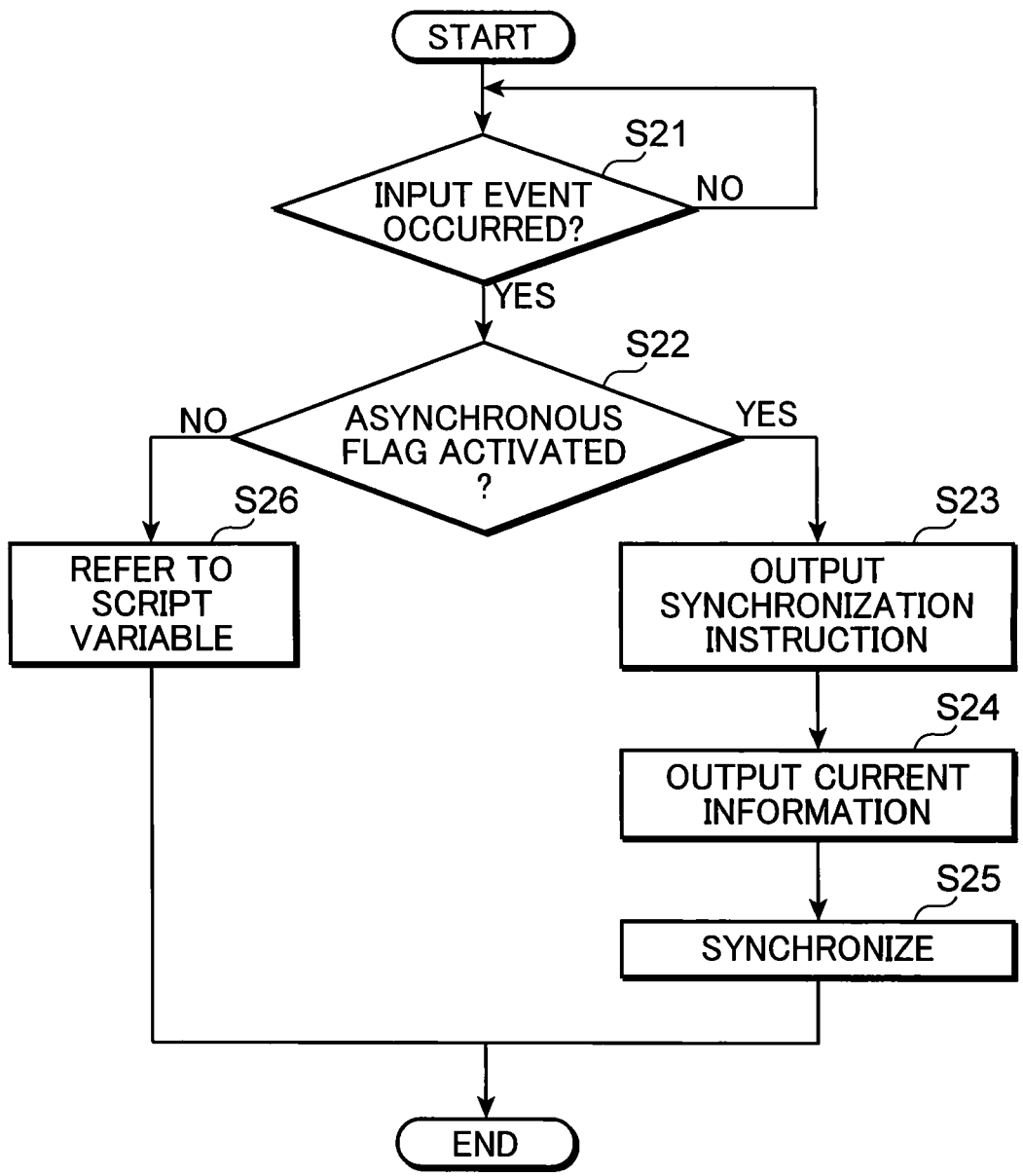
FIG. 5 is a flowchart showing a processing to be performed by the animation drawing device as the modification of the first embodiment of the invention.

FIG. 5 is a flowchart showing a processing to be performed by the animation drawing device 10 as the modification of the first embodiment of the invention. The flowchart of FIG. 5 is a flowchart to be executed by the animation drawing device 10, in response to output of a synchronization instruction at the timing TM5 in FIG. 4.

Firstly, upon occurrence of an input event in response to user's clicking of a mouse (YES in Step S21), the interpreter 11 judges whether an asynchronous flag is activated (Step S22). On the other hand, in the case where an input event has not occurred (NO in Step S21), the processing is returned to Step S21.

In the case where the asynchronous flag is activated (YES in Step S22), the interpreter 11 outputs a synchronization instruction to the animation controller 12 (Step S23). In this example, in the case where the asynchronous flag is activated, the animation is being executed, and the script variable and the native variable are not synchronized with each other. Therefore, the current script variable does not indicate the current position of the GUI object OB1. In this case, the interpreter 11 outputs a synchronization instruction to the animation controller 12 for synchronizing between the script variable and the native variable.

Then, the animation controller 12 outputs the current native variable to the interpreter 11 as current information (Step S24). Then, the interpreter 11 converts the native variable into a script variable for updating the script variable, thereby synchronizing between the script variable and the native variable (Step S25).

By performing the above operation, the interpreter 11 is operable to recognize the current position of the GUI object OB1. This makes it possible to judge whether the mouse pointer PT and the GUI object overlap each other.

In the case where it is judged that the GUI object OB1 and the mouse pointer PT overlap each other, the interpreter 11 judges that the user has clicked the GUI object OB1, and executes a predetermined processing program to be executed in response to user's clicking of the GUI object OB1. On the other hand, in the case where it is judged that the GUI object OB1 and the mouse pointer PT do not overlap each other, the interpreter 11 is not required to execute a processing program to be executed in response to user's clicking of the GUI object OB1.

The interpreter 11 specifies the width and the height of the GUI object OB1 shown in FIG. 6, based on the current position of the GUI object OB1, and sets a region in which the GUI object OB1 is drawn, based on the specified width and height. Then, in the case where the mouse pointer PT is located in the region, the interpreter 11 judges that the mouse pointer PT and the GUI object OB1 overlap each other.

On the other hand, in the case where the asynchronous flag is deactivated (NO in Step S22), the interpreter 11 refers to the script variable (Step S26) for recognizing the current position of the GUI objet OB1, because the script variable and the native variable are synchronized with each other.

In the foregoing description, as shown in FIG. 8, timestamps are used as the planned change information IF1. Alternatively, points of time after start of animation may be used. In the foregoing description, the position of the GUI object OB1 is used as the attribute information. The invention is not limited to the above. At least one of the size, the enlargement/reduction ratio, the rotation rate (roll angle, pitch angle, yaw angle), the color, the transmittance, and the image of the GUI object OB1 may be included in addition to the position of the GUI object OB1 or in place of the position of the GUI object OB1.

In the above modification, the planned change information IF1 shown in FIG. 8 may be provided with columns on the size, the enlargement/reduction ratio, the rotation rate (roll angle, pitch angle, yaw angle), the color, the transmittance, and the image of each GUI object, and these information may be defined for each of the timestamps.

Further, in the foregoing description, the animation controller 12 generates the planned change information IF1. Alternatively, the interpreter 11 may generate the planned change information IF1. In the modification, similarly to the animation controller 12, the interpreter 11 may generate the planned change information IF1 from the attribute information described in the column R1 in FIG. 6 and the attribute information Z1 shown in FIG. 7 when animation is started.

Then, the interpreter 11 causes the planned change information storage 22 to store the generated planned change information IF1 therein, and outputs the generated planned change information IF1 to the animation controller 12. Upon receiving the planned change information IF1 from the interpreter 11, the animation controller 12 converts the planned change information IF1 into a native variable, and causes the planned change information storage 23 to store the converted planned change information IF1.

With the above arrangement, both the interpreter 11 and the animation controller 12 are operable to refer to the planned change information IF1 to thereby reduce the amount of data to be sent/received between the interpreter 11 and the animation controller 12.

There is known a focus attribute as one of the attribute information on GUI objects. The focus attribute is attribute information as to whether a GUI object is an object to be currently manipulated. The focus attribute is assigned with two states i.e. a "focused state" and a "defocused state". For instance, in the case where a GUI object and a mouse point overlap each other, a "focused state" is assigned to the focus attribute. In the case where a "focused state" is assigned as the focus attribute of a certain GUI object, the focus attribute of the GUI object may be changed to a "defocused state", in response to activation of the asynchronous flag after animation is started. This configuration is effective to GUI animation based on the premise that a state that the mouse pointer and the GUI object overlap each other is shifted to a state that the mouse pointer and the GUI object do not overlap each other in response to start of animation and start of movement of a GUI object.

In the case where the animation is finished and the asynchronous flag is deactivated, the interpreter 11 may judge whether the GUI object and the mouse pointer overlap each other, based on the coordinate at the end point of the GUI object and the current position of the mouse pointer, update the focus attribute based on the judgment result, and update the focus attribute to a latest state.

In the modification as described above, the interpreter 11 is operable to synchronize between the script variable and the native variable, as necessary, during animation. Accordingly, it is possible to judge whether the mouse pointer PT and the GUI object OB1 overlap each other even during animation. On the other hand, in the case where it is not necessary to synchronize between the script variable and the native variable, the interpreter 11 is inoperative to perform a synchronization processing, and the animation controller 12 executes an animation drawing processing by sequentially updating the native variable. Accordingly, the animation controller 12 is operable to execute an animation drawing processing without acquiring a script variable from the interpreter 11. Thus, the above arrangement is advantageous in preventing lowering of the execution speed of animation.

Alternatively, it may be possible to combine the animation drawing device 10 in the first embodiment and the animation drawing device 10 in the modification. In other words, the animation controller 12 may output a native variable in accordance with a timestamp, and the interpreter 11 may synchronize the script variable with the native variable, as necessary.

Second Embodiment

Figure 10:
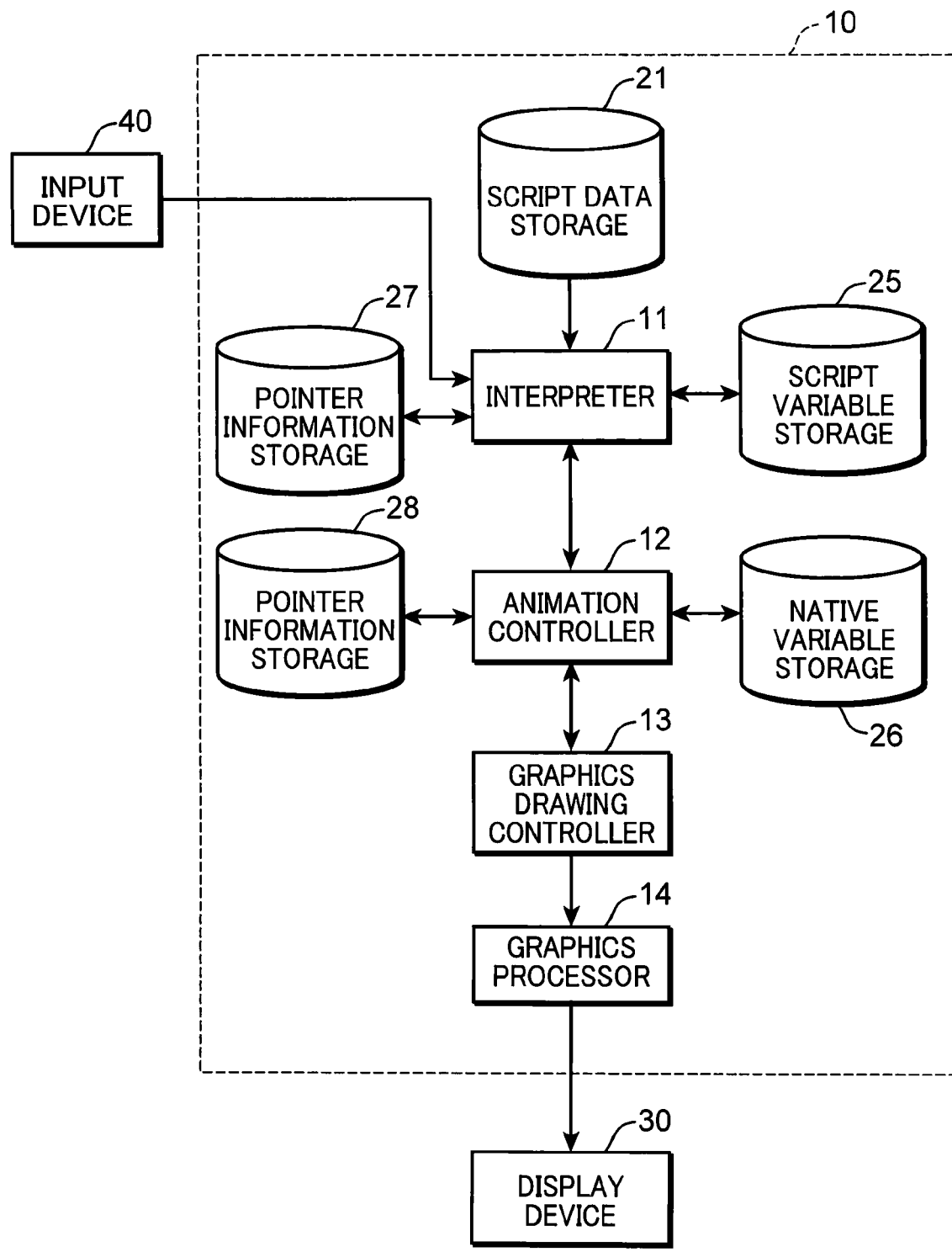
FIG. 10 is a configuration diagram of an animation drawing device in the second embodiment of the invention.

An animation drawing device 10 in the second embodiment has a feature that in the case where an overlapping state between a mouse pointer PT and a GUI object changes during animation, an animation controller 12 outputs a native variable to an interpreter 11. FIG. 10 shows a configuration diagram of the animation drawing device 10 in the second embodiment of the invention. Elements in the second embodiment are indicated with the same reference numerals as in the first embodiment, and description thereof is omitted herein. The second embodiment is described also referring to FIG. 6, FIG. 7, FIG. 9.

In this embodiment, upon interpreting an animation drawing instruction, the interpreter 11 outputs a position of the mouse pointer PT displayed on a screen 301 to the animation controller 12.

The animation controller 12 converts the position of the mouse pointer PT outputted from the interpreter 11 into a native variable, and causes a pointer information storage 28 to store the native variable therein.

Then, in the case where the overlapping state between the mouse pointer PT and the GUI object OB1 constituting a GUI changes during animation, the animation controller 12 outputs the native variable to the interpreter 11 at a timing when the overlapping state has changed.

In this example, the animation controller 12 refers to the position of the mouse pointer PT stored in the pointer information storage 28 each time the native variable is updated for comparing between the stored position and the current position of the mouse pointer PT, whereby it is judged whether the overlapping state between the GUI object OB1 and the mouse pointer PT has changed.

Specifically, in the case where there is no more overlapping between the GUI object OB1 and the mouse pointer PT from a state that the GUI object OB1 and the mouse pointer PT overlap each other in the previous judgment, the animation controller 12 judges that the overlapping state between the GUI object OB1 and the mouse pointer PT has changed.

Further, in the case where there is detected an overlapping between the GUI object OB1 and the mouse pointer PT from a state that the GUI object OB1 and the mouse pointer PT do not overlap each other in the previous judgment, the animation controller 12 also judges that the overlapping state between the GUI object OB1 and the mouse pointer PT has changed.

More specifically, the animation controller 12 specifies the position of the GUI object OB1 based on the current native variable. Then, the animation controller 12 sets a rectangular region to be defined by the width and the height of the GUI object OB1 stored in the column R1 shown in FIG. 6, with the specified position defined as the vertex at the uppermost and leftmost position of the GUI object OB1. Then, in the case where the position of the mouse pointer PT stored in the pointer information storage 28 is located in the area of the rectangular region, the animation controller 12 judges that the GUI object OB1 and the mouse pointer PT overlap each other; and in the case where the position of the mouse pointer PT is not located in the area of the rectangular region, the animation controller 12 judges that the GUI objet OB1 and the mouse pointer PT do not overlap each other.

Then, in the case where the judgment result on the overlapping state in a frame immediately preceding the current frame differs from the judgment result on the overlapping state in the current frame, the animation controller 12 judges that the overlapping state between the GUI object OB1 and the mouse pointer PT has changed.

The pointer information storage 27 stores the position of the mouse pointer PT to be managed by the interpreter 11. The pointer information storage 28 stores the position of the mouse pointer PT to be managed by the animation controller 12. The position of the mouse pointer PT is a copy of the position of the mouse pointer PT to be managed by the interpreter 11.

As shown in FIG. 9, the mouse pointer PT is moved in response to user's manipulation of the input device 40. In this example, the interpreter 11 detects the position of the mouse pointer PT on the screen 301, based on a signal to be outputted from the input device 40.

In the example shown in FIG. 9, the mouse pointer PT at the time of the occurrence of an input event is located at the uppermost and leftmost coordinate (107, 113). Accordingly, the interpreter 11 detects the coordinate (107, 113) as the position of the mouse pointer PT. Hereinafter, description is made based on the premise that the uppermost and leftmost coordinate of the mouse pointer PT is defined as the position of the mouse pointer PT.

Figure 11:
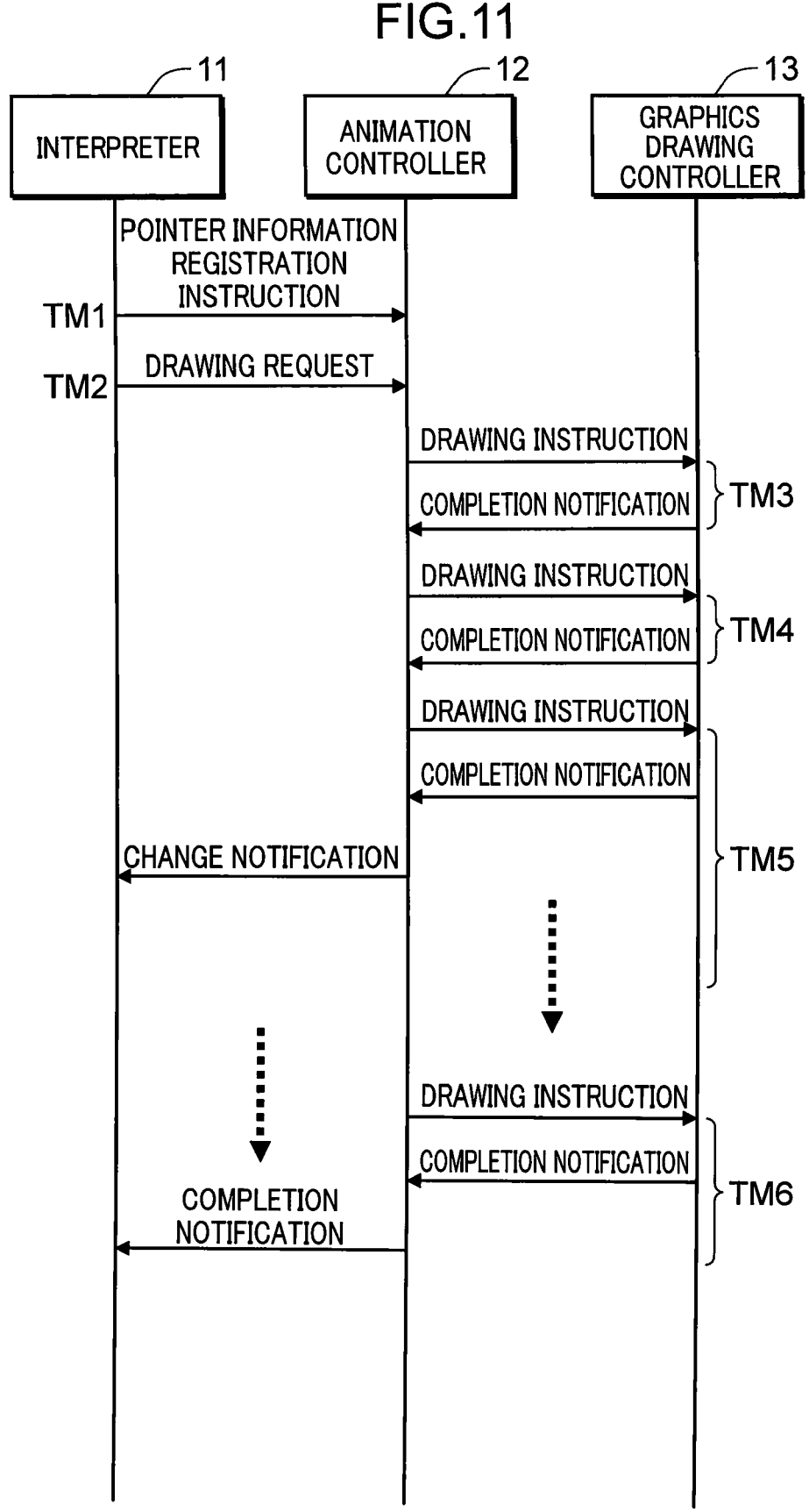
FIG. 11 is a timing chart showing data sending/receiving between constituent elements of the animation drawing device in the second embodiment of the invention.
Figure 15:
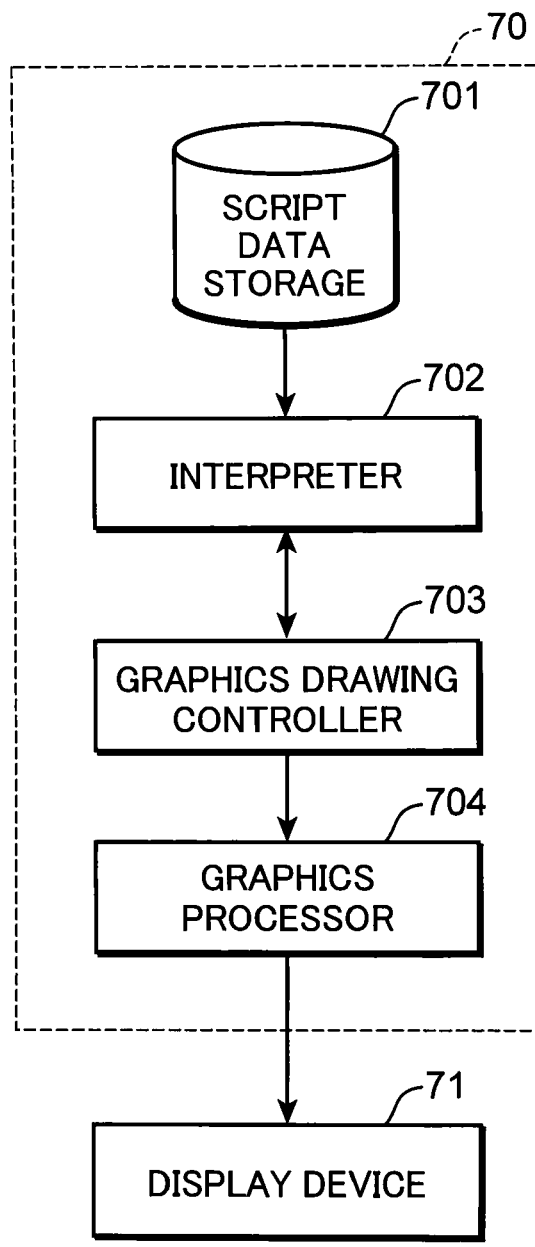
FIG. 15 is a block diagram showing a general configuration of a conventional animation drawing device for animation-displaying a GUI by executing script data, as disclosed in patent literature 1.
Figure 16:
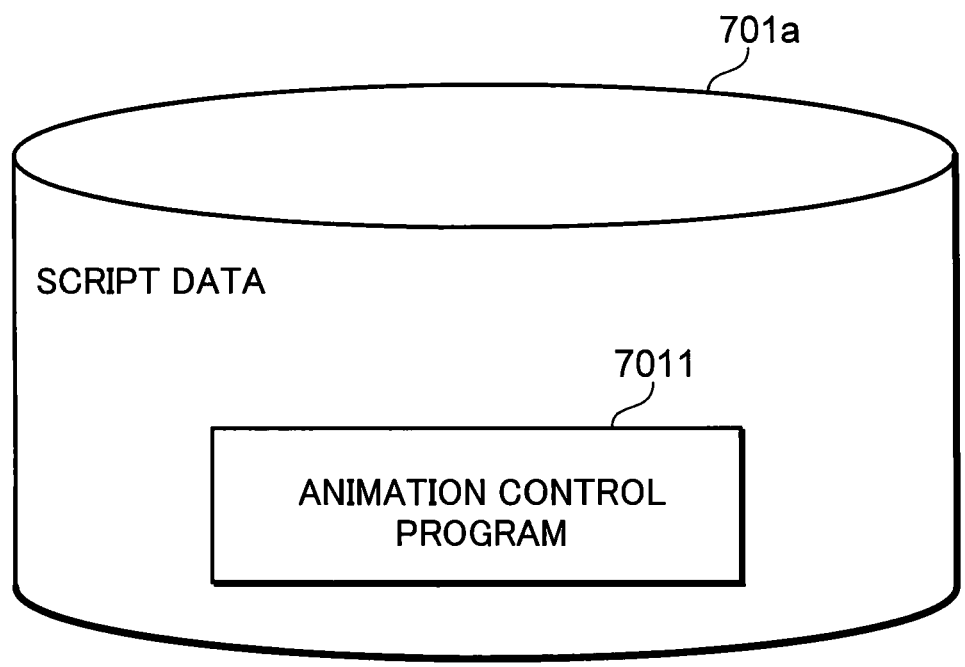
FIG. 16 is a diagram conceptually showing a structure of script data to be described in the case where a conventional animation drawing device is used.

FIG. 11 is a timing chart showing data sending/receiving between the constituent elements of the animation drawing device 10 in the second embodiment of the invention.

Firstly, at the timing TM1, upon interpreting an animation drawing instruction described in the script data, the interpreter 11 outputs, to the animation controller 12, a pointer information registration instruction for registering the position of the mouse pointer PT at this point of time. By performing the above operation, the animation controller 12 causes the pointer information storage 28 to store the position of the mouse pointer PT therein at the time of the occurrence of an input event.

Then, similarly to the configuration shown in FIG. 2, the interpreter 11 outputs a drawing request to the animation controller 12 (at the timing TM2). In other words, a script variable including the attribute information shown in the column R1 in FIG. 6 and the attribute information Z1 shown in FIG. 7 is outputted as the drawing request. In performing this operation, the animation controller 12 judges whether the GUI object OB1 and the mouse pointer PT overlap each other.

Then, similarly to the configuration shown in FIG. 2, the animation controller 12 repeats the operation of outputting a drawing instruction to the graphics drawing controller 13 and sending/receiving a completion notification to and from the graphics drawing controller 13, and animation-displays a GUI while sequentially updating the native variable (at the timings TM3, TM4). In this example, the animation controller 12 compares between the position of the mouse pointer PT stored in the pointer information storage 28, and the position of the GUI object OB1 as represented by the native variable each time the native variable is updated for monitoring whether the overlapping state between the mouse pointer PT and the GUI object OB1 has changed.

Then, at the timing TM5, in the case where it is judged that the overlapping state between the GUI object OB1 and the mouse pointer PT has changed, the animation controller 12 outputs a change notification to the interpreter 11.

In this example, similarly to the configuration shown in FIG. 2, the animation controller 12 outputs a native variable to the interpreter 11 as a change notification. By performing the above operation, the interpreter 11 is operable to recognize the current position of the GUI object OB1.

Then, similarly to the configuration shown in FIG. 2, upon finishing the animation, the animation controller 12 outputs a completion notification to the interpreter 11 (at the timing TM6).

FIG. 12 is a flowchart showing a processing to be performed by the animation drawing device 10 in the second embodiment of the invention. The interpreter 11 sequentially interprets the script data, and upon interpreting an animation drawing instruction, the interpreter 11 outputs, to the animation controller 12, a pointer information registration instruction for use in registering the current position of the mouse pointer PT and a drawing request (Step S31). By performing the above operation, the animation controller 12 is operable to recognize the position of the mouse pointer PT when animation is started. A coordinate of the mouse pointer PT may be used as the position of the mouse pointer PT. The invention is not limited to the above, but the area of the mouse pointer PT may be used as the position of the mouse pointer PT. Information capable of specifying the contour of the mouse pointer PT shown in FIG. 9 may be used as the area of the mouse pointer PT.

Subsequently, the animation controller 12 causes the pointer information storage 28 to store the position of the mouse pointer PT as represented by the pointer registration information outputted from the interpreter 11 (Step S32).

Since Steps S33 through S36, and S39 are the same as Steps S4 through S7, and S10 shown in FIG. 3, description thereof will be omitted herein.

In Step S37, the animation controller 12 compares between the native variable, and the position of the mouse pointer PT stored in the pointer information storage 28 to judge whether the overlapping state between the GUI object OB1 and the mouse pointer PT has changed. Then, in the case where it is judged that the overlapping state between the mouse pointer PT and the GUI object OB1 has changed (YES in Step S37), the animation controller 12 proceeds the processing to Step S38; and in the case where it is judged that the overlapping state has not changed (NO in Step S37), the animation controller 12 returns the processing to Step S35.

In the example shown in FIG. 9, assuming that the position of the mouse pointer PT has not changed, the position of the GUI object OB1 is located at the position PS2 at a drawing point of time for the second frame after animation is started. Thus, the overlapping state is changed from "an overlapped state" to "a non-overlapped state".

Specifically, referring to FIG. 9, when the position of the GUI object OB1 is located at the position PS2, the coordinate at the uppermost and leftmost vertex of the GUI object OB1 is (110, 120), and the position of the mouse pointer PT is (107, 113). In this state, the GUI object OB1 and the mouse pointer PT do not overlap each other. Then, the animation controller 12 judges that the overlapping state between the GUI object OB1 and the mouse pointer PT has changed, and outputs a native variable including the position PS2 to the interpreter 11 as a change notification (Step S38).

By performing the above operation, in the case where it is required to recognize the current position of the GUI object OB1 in response to the occurrence of an input event during animation, the interpreter 11 is operable to recognize the current position of the GUI object OB1 by acquiring the native variable from the animation controller 12. Then, the interpreter 11 is operable to detect a change in the overlapping state between the GUI object OB1 and the mouse pointer PT, based on the current position of the mouse pointer PT and the recognized current position of the GUI object OB1.

Then, in the case where there is detected a change in the overlapping state, for instance, a predetermined program is executed in accordance with the change. By performing the above operation, the interpreter 11 is operable to perform an appropriate operation in response to user's manipulation even during animation.

On the other hand, when display of animation is started, the animation controller 12 executes an animation drawing processing while sequentially updating the native variable, whereby the execution speed of animation can be increased.

In the foregoing description, there is described an example, wherein the pointer information registration instruction is outputted only once. Alternatively, the pointer information registration instruction may be outputted plural number of times during animation. In the modification, for instance, the interpreter 11 may output the pointer information registration instruction in response to the occurrence of an input event such as user's clicking of a mouse button. Then, the interpreter 11 includes, in the pointer information registration instruction, the position of the mouse pointer PT at the timing when the input event has occurred, and causes the pointer information storage 27 to store the position of the mouse pointer PT therein.

Upon receiving the pointer information registration instruction, the animation controller 12 causes the pointer information storage 28 to store the position of the mouse pointer PT included in the pointer information registration instruction, and detects a change in the overlapping state between the GUI object OB1 and the mouse pointer PT by comparing between the position of the mouse pointer PT and the native variable each time the native variable is updated.

Each of the blocks shown in FIG. 1 and FIG. 10 is implemented by an LSI as a typical integrated circuit. In the case where the blocks are implemented by LSIs, each of the blocks may be individually configured into a one-chip unit, or a part or all of the blocks may be configured into a one-chip unit.

The LSI may include an IC, an LSI, a system LSI, a super LSI and an ultra LSI, depending on the degree of integration.

Further alternatively, the method of manufacturing the integrated circuit is not limited to an LSI method. The integrated circuit may be implemented by a dedicated circuit or a general-purpose processor. Further alternatively, after fabricating an LSI, a programmable FPGA (Field Programmable Gate Array), or a reconfigurable processor capable of reconfiguring connection or setting of circuit cells within the LSI may also be used.

Further, if an integration circuit technology substantially equivalent to the LSI technology is developed in the future by the progress of semiconductor technology or by another technology derived from the semiconductor technology, it is needless to say that the functional blocks may be integrated, using the novel technology. It is also possible to perform integration, using the biotechnology.

Further alternatively, each of the blocks shown in FIG. 1 and FIG. 10 may be configured by a software. In the modification, each of the blocks shown in FIG. 1 and FIG. 10 may be implemented by installing an animation drawing program for functioning a computer as the animation drawing device 10 in the computer. Further alternatively, the animation drawing program may be provided to the user by storing the animation drawing program in a computer-readable recording medium such as a DVD-ROM or a CD-ROM. Further alternatively, the animation drawing program may be stored in a Web server, and provided to the user by allowing the user to download the animation drawing program via the Internet.

In the above modification, the interpreter 11 through the graphics drawing controller 13 shown in FIG. 1 are configured by e.g. a CPU, the graphics processor 14 may be configured by e.g. a GPU, the script data storage 21 through the native variable storage 26 may be configured by e.g. a rewritable storage device such as an RAM, an ROM, or a flash memory.

Further, in FIG. 10, the interpreter 11 through the graphics drawing controller 13 are configured by a CPU, the graphics processor 14 is configured by a GPU, and the pointer information storages 27, 28, the script variable storage 25, and the native variable storage 26 are configured by e.g. a storage device.

Next, a concrete example of the invention is described. FIG. 13 is a diagram showing an example of script data to be used in the animation drawing devices 10 in the first and second embodiments of the invention. FIG. 14 is a diagram showing an example of script data used in a conventional GUI animation drawing device. In the following, comparison between the script data shown in FIG. 13 and the script data shown in FIG. 14 is described. Firstly, the conventional script data shown in FIG. 14 is explained.

1st through 3rd lines: declares start of an HTML document. The third line declares that the title of this script data is a sample script.

4th through 5th lines: declares that the JavaScript (trademark) is embedded in the HTML.

6th line: defines the value of a timer which determines the interval of one frame of animation.

8th through 12th lines: declares a class for storing a two-dimensional coordinate.

14th line: declares a data structure of a variable for storing an end point of a GUI object.

15th line: declares a data structure of a variable for storing a change amount of the GUI object.

17th through 26th lines: is a main routine of the sample script.

In the 19th through 20th lines, a variable of a start point of the GUI object is declared, and the value of the start point is stored in the variable. In the 21st through 22nd lines, the variable of the end point is declared, and the value of the end point is stored in the variable. In the 23rd through 24th lines, the variable of the change amount is declared, and the value of the change amount is stored in the variable. In the 25th line, a function (anime) of animation start is called out. The function in the 25th line corresponds to an animation drawing instruction.

28th through 31st lines: is a declaration of a function (done) to be called out when animation is finished.

33rd through 40th lines: is a declaration of the function (anime) for starting drawing one frame. In the 35th through 38th lines, each of the end point and the change amount are broken down into an X-component and a Y-component, the X-components and the Y-components are temporarily stored in the variable. In the 39th line, a function (moveObj) of drawing one frame is called out.

42nd through 56th lines: is a declaration of the function (moveObj) of drawing one frame. In the 44th line, the ID of the GUI object for animation is acquired. In the 45th line, the X-component of the GUI object is added by the change amount of the X-component declared in the 23rd line. In the 46th line, the Y-component of the GUI object is added by the change amount of the Y-component declared in the 24th line. In the 47th line, it is judged whether the animation has been finished. In the case where the animation has not been finished, the 49th through 50th lines are executed, and in the case where the animation has been finished, the 54th line is executed.

In the 49th through 50th lines, the function (moveObj) is executed each time waitTime elapses for drawing one frame. In the 54th line, a function (df=done) to be called out when animation is finished is called out.

57th through 58th lines: is a declaration of finishing the JavaScript (trademark) embedded in the HTML document.

59th line: is a declaration of finishing a HEAD portion of the HTML document.

60th line: is a declaration for calling out the main routine of the sample script in loading the HTML document.

61st line: is a declaration of a character string indicating the GUI object for animation, and "obj" is designated as "id" for designating the GUI object.

62nd through 63rd lines: is a declaration of finishing the HTML document.

As described above, in the conventional script data, for instance, as shown in the 44th line, a retrieval processing for acquiring "id" is executed each time one frame is drawn, and it has been difficult to increase the execution speed of animation.

Next, the drawing of FIG. 13 is explained. Description on the same script in FIG. 13 as in FIG. 14 is omitted.

33rd through 36th lines: is a portion that differs from the conventional script data. Control is transferred to the animation controller 12 by "nativeAnime" in the 35th line. In other words, the interpreter 11 sequentially interprets the script of the main routine in the 17th through 26th lines, and upon interpreting "anime" in the 25th line, which is an animation drawing instruction, the interpreter 11 outputs, to the animation controller 12, a script variable such as "ObjName", "ep", "d", and "df" as a drawing request in accordance with "nativeAnime" in the 35th line. Thus, the control is transferred to the animation controller 12.

By performing the above operation, the animation controller 12 draws animation by executing a program module described in the native language corresponding to "nativeAnime".

Then, the animation controller 12 outputs a completion notification to the interpreter 11 upon finishing the animation. The animation controller 12 draws animation by executing the program module described in the native language. This arrangement eliminates the need of executing a retrieval processing each time one frame is drawn, as shown in the 44th line in FIG. 14. Thus, in the animation drawing device 10, it is possible to increase the execution speed of animation.

The script data shown in FIG. 13 and FIG. 14 is a typical example for showing a script difference between the animation drawing device of the invention, and a conventional GUI animation drawing device, and the contents other than those for explaining the difference is omitted. Further, various modifications are applicable, as far as the above advantage is obtained.

The following is a summary of the technical features of the animation drawing device.

(1) The animation drawing device is an animation drawing device for animation-displaying a graphical user interface (GUI) by executing script data described in an interpreter script language. The animation drawing device includes an interpreter which sequentially interprets the script data by an interpreter method; and an animation controller which animation-displays the GUI by executing a program module described in a native language. The interpreter outputs a drawing request to the animation controller upon interpreting an animation drawing instruction defined with use of a predetermined script variable, and the animation controller converts the script variable into a native variable in the form of the native language upon receiving the drawing request, and animation-displays the GUI while sequentially updating the native variable.

With the above arrangement, the animation controller is operable to animation-display the GUI while sequentially updating the native variable, independently of the interpreter. Thus, the above arrangement eliminates the need of accessing the interpreter during animation by the animation controller, and eliminates the need of performing a retrieval processing for the interpreter, which has conventionally been performed when the animation controller accesses the interpreter. Thus, the above arrangement is advantageous in increasing the execution speed of animation.

(2) Preferably, the animation controller may generate planned change information showing a state of the GUI at one or more drawing points of time during a period from start to finish of animation, based on the script variable, output the native variable to the interpreter at a timing when a drawing point of time as represented by the planned change information is reached, and output a completion notification to the interpreter upon finishing the animation.

With the above arrangement, the animation controller outputs the native variable to the interpreter only when a drawing point of time as represented by the planned change information is reached. This arrangement remarkably reduces the number of times of data sending/receiving between the animation controller and the interpreter, thereby preventing lowering of the execution speed of animation.

(3) Preferably, the animation controller may output the planned change information to the interpreter.

With the above arrangement, since the interpreter also holds the planned change information, the amount of data to be sent/received between the interpreter and the animation controller can be reduced. This arrangement is advantageous in reducing the processing load of the animation controller and the interpreter.

(4) Preferably, the interpreter may activate an asynchronous flag indicating that the script variable is not synchronized with the native variable when animation is started, deactivate the asynchronous flag upon receiving the completion notification from the animation controller, and execute a synchronization processing of causing the animation controller to output the native variable in the case where a predetermined input event has occurred in response to user's manipulation of an input device while the asynchronous flag is being activated.

With the above arrangement, in the case where an input event has occurred, the interpreter causes the animation controller to forcibly output the current native variable for synchronizing between the script variable and the native variable. With this arrangement, the interpreter is operable to recognize the current state of the GUI object, and perform a processing of e.g. judging whether the mouse pointer overlaps the GUI object when the input event has occurred.

(5) Preferably, the interpreter may generate planned change information indicating a state of the GUI at one or more drawing points of time during a period from start to finish of animation, based on the script variable, and output the planned change information to the animation controller, and the animation controller may output the native variable to the interpreter at a timing when a drawing point of time as represented by the planned change information is reached, and output a completion notification to the interpreter upon finishing the animation.

With the above arrangement, similarly to (2), it is possible to prevent lowering of the execution speed of animation. Further, since the planned change information is generated by the interpreter, it is possible to reduce the processing load of the animation controller.

(6) Preferably, the interpreter may output the planned change information to the animation controller.

With the above arrangement, since the animation controller also holds the planned change information, the amount of data to be sent/received between the interpreter and the animation controller can be reduced. This is advantageous in reducing the processing load of the animation controller and the interpreter.

(7) Preferably, the interpreter may activate an asynchronous flag indicating that the script variable is not synchronized with the native variable when animation is started, deactivate the asynchronous flag upon receiving the completion notification from the animation controller, and execute a synchronization processing of causing the animation controller to output the native variable in the case where a predetermined input event has occurred in response to user's manipulation of an input device while the asynchronous flag is being activated.

With the above arrangement, substantially the same effect as (4) can be obtained.

(8) Preferably, the planned change information may indicate the drawing point of time, with use of a timestamp indicating what number of frame is currently drawn from start of animation.

With the above arrangement, since a drawing point of time is designated by the timestamp, the animation controller is operable to detect an output timing of the native variable by merely counting the number of updated frames since animation is started.

(9) Preferably, the planned change information may include attribute information of a GUI object at the drawing point of time.

With the above arrangement, since the planned change information can be generated with use of the attribute information defined by the script data, it is possible to generate the planned change information with a simplified processing.

(10) Preferably, the interpreter may output a position of a pointer displayed on a screen upon interpreting the animation drawing instruction, and the animation controller may cause a storage device to store the position of the pointer outputted from the interpreter, and compare between the position of the pointer stored in the storage device and the native variable during animation, whereby the native variable is outputted to the interpreter at a timing when a change in an overlapping state between the pointer and a GUI object constituting the GUI is detected.

With the above arrangement, in the case where an input event has occurred during animation, and it is necessary to recognize the current state of the GUI object, the interpreter is operable to recognize the current state of the GUI object by acquiring the native variable from the animation controller 12.

(11) Preferably, the animation drawing device may further include a graphics drawing controller which controls a graphics processor, wherein the animation controller updates the native variable each time a drawing point of time for one frame is reached, and outputs a drawing instruction for drawing one frame to the graphics drawing controller, and the graphics drawing controller, upon receiving the drawing instruction from the animation controller, breaks down the received drawing instruction into a low-level drawing command executable by the graphics processor, and outputs the drawing command to the graphics processor.

With the above arrangement, since the animation controller causes the graphics drawing processor to execute a low-level drawing processing, it is possible to reduce the processing load of the animation controller.

(12) Preferably, the interpreter may access the script variable with use of a hash retrieval.

In the above arrangement, the script variable is accessed with use of the hash retrieval whose processing load is high. However, since the number of times of access is reduced by adopting the arrangement such as (1), the above arrangement is advantageous in increasing the execution speed of animation.

INDUSTRIAL APPLICABILITY

The inventive GUI animation drawing device is capable of speedily drawing a GUI animation described in an interpreter script language, and accordingly, is useful for a device loaded with a web browser.

The invention claimed is:

1. An animation drawing device for animation-displaying a graphical user interface (GUI) by executing script data described in an interpreter script language, comprising:
   an interpreter which sequentially interprets the script data by an interpreter method; and
   an animation controller which animation-displays the GUI by executing a program module described in a native language, wherein
   the interpreter outputs a drawing request to the animation controller upon interpreting an animation drawing instruction defined with use of a predetermined script variable, and
   the animation controller converts the script variable into a native variable in the form of the native language upon receiving the drawing request, animation-displays the GUI while sequentially updating the native variable, generates planned change information showing a state of the GUI at one or more drawing points of time during a period from start to finish of animation, based on the script variable, outputs the native variable to the interpreter at a timing when a drawing point of time as represented by the planned change information is reached, and outputs a completion notification to the interpreter upon finishing the animation.

2. The animation drawing device according to claim 1, wherein
   the animation controller outputs the planned change information to the interpreter.

3. The animation drawing device according to claim 1, wherein
   the interpreter activates an asynchronous flag indicating that the script variable is not synchronized with the native variable when animation is started, deactivates the asynchronous flag upon receiving the completion notification from the animation controller, and executes a synchronization processing of causing the animation controller to output the native variable in the case where a predetermined input event has occurred in response to user's manipulation of an input device while the asynchronous flag is being activated.

4. The animation drawing device according to claim 1, wherein
   the planned change information indicates the drawing point of time, with use of a timestamp indicating what number of frame is currently drawn from start of animation.

5. The animation drawing device according to claim 1, wherein
   the planned change information includes attribute information of a GUI object at the drawing point of time.

6. The animation drawing device according to claim 1, further comprising:
   a graphics drawing controller which controls a graphics processor, wherein
   the animation controller updates the native variable each time a drawing point of time for one frame is reached, and outputs a drawing instruction for drawing one frame to the graphics drawing controller, and the graphics drawing controller, upon receiving the drawing instruction from the animation controller, breaks down the received drawing instruction into a low-level drawing command executable by the graphics processor, and outputs the drawing command to the graphics processor.

7. The animation drawing device according to claim 1, wherein the interpreter accesses the script variable with use of a hash retrieval.

8. An animation drawing device for animation-displaying a graphical user interface (GUI) by executing script data described in an interpreter script language, comprising:

an interpreter which sequentially interprets the script data by an interpreter method; and an animation controller which animation-displays the GUI by executing a program module described in a native language, wherein the interpreter outputs a drawing request to the animation controller upon interpreting an animation drawing instruction defined with use of a predetermined script variable, the animation controller converts the script variable into a native variable in the form of the native language upon receiving the drawing request, animation-displays the GUI while sequentially updating the native variable, the interpreter generates planned change information indicating a state of the GUI at one or more drawing points of time during a period from start to finish of animation, based on the script variable, and outputs the planned change information to the animation controller, and the animation controller outputs the native variable to the interpreter at a timing when a drawing point of time as represented by the planned change information is reached, and outputs a completion notification to the interpreter upon finishing the animation.

9. The animation drawing device according to claim 8, wherein the interpreter outputs the planned change information to the animation controller.

10. The animation drawing device according to claim 8, wherein the interpreter activates an asynchronous flag indicating that the script variable is not synchronized with the native variable when animation is started, deactivates the asynchronous flag upon receiving the completion notification from the animation controller, and executes a synchronization processing of causing the animation controller to output the native variable in the case where a predetermined input event has occurred in response to user's manipulation of an input device while the asynchronous flag is being activated.

11. An animation drawing device for animation-displaying a graphical user interface (GUI) by executing script data described in an interpreter script language, comprising:

an interpreter which sequentially interprets the script data by an interpreter method; and an animation controller which animation-displays the GUI by executing a program module described in a native language, wherein the interpreter outputs a drawing request to the animation controller upon interpreting an animation drawing instruction defined with use of a predetermined script variable, the animation controller converts the script variable into a native variable in the form of the native language upon receiving the drawing request, and animation-displays the GUI while sequentially updating the native variable, the interpreter outputs a position of a pointer displayed on a screen upon interpreting the animation drawing instruction, and the animation controller causes a storage device to store the position of the pointer outputted from the interpreter, compares between the position of the pointer stored in the storage device and the native variable during animation, and outputs the native variable to the interpreter at a timing when a change in an overlapping state between the pointer and a GUI object constituting the GUI is detected.

12. A non-transitory computer-readable recording medium which stores an animation drawing program which causes a computer to function as an animation drawing device for animation-displaying a graphical user interface (GUI) by executing script data described in an interpreter script language, the animation drawing program causing the computer function as:

an interpreter which sequentially interprets the script data by an interpreter method; and an animation controller which animation-displays the GUI by executing a program module described in a native language, wherein the interpreter outputs a drawing request to the animation controller upon interpreting an animation drawing instruction defined with use of a predetermined script variable, and the animation controller converts the script variable into a native variable in the form of the native language upon receiving the drawing request, animation-displays the GUI while sequentially updating the native variable, generates planned change information showing a state of the GUI at one or more drawing points of time during a period from start to finish of animation, based on the script variable, outputs the native variable to the interpreter at a timing when a drawing point of time as represented by the planned change information is reached, and outputs a completion notification to the interpreter upon finishing the animation.

13. An animation drawing method for animation-displaying a graphical user interface (GUI) by executing script data described in an interpreter script language, the animation drawing method comprising:

an interpreter step of causing an interpreter to sequentially interpret the script data by an interpreter method; and an animation control step of causing an animation controller to animation-display the GUI by executing a program module described in a native language, wherein at the interpreter step, a drawing request is outputted to the animation controller upon interpreting an animation drawing instruction defined with use of a predetermined script variable, and at the animation control step, the script variable is converted into a native variable in the form of the native language upon receiving the drawing request, and the GUI is animation-displayed while sequentially updating the native variable, planned change information showing a state of the GUI at one or more drawing points of time during a period from start to finish of animation is generated, based on the script variable, the native variable is output to the interpreter at a timing when a drawing point of time as represented by the planned change information is reached, and a completion notification is output to the interpreter upon finishing the animation.

\* \* \* \* \*